United States Patent
Tekiela et al.

(10) Patent No.: US 11,232,475 B2
(45) Date of Patent: Jan. 25, 2022

(54) SYSTEMS AND METHODS FOR INFLUENCING MARKETING CAMPAIGNS

(71) Applicant: STRONGVIEW SYSTEMS, INC., Redwood City, CA (US)

(72) Inventors: Robert S. Tekiela, Greenbrae, CA (US); Ashish G. Desai, San Francisco, CA (US); David A. Bell, Berkeley, CA (US); Ryan Michael Koonce, Austin, TX (US); James Newton Calhoun, Ross, CA (US); Sage Bray, San Francisco, CA (US)

(73) Assignee: Selligent, Inc., Redwood City, CA (US)

( * ) Notice: Subject to any disclaimer, the term of this patent is extended or adjusted under 35 U.S.C. 154(b) by 532 days.

(21) Appl. No.: 15/045,203

(22) Filed: Feb. 16, 2016

(65) Prior Publication Data

US 2016/0162929 A1 Jun. 9, 2016

Related U.S. Application Data

(63) Continuation-in-part of application No. 13/858,772, filed on Apr. 8, 2013, now abandoned, which is a
(Continued)

(51) Int. Cl.
*G06Q 30/02* (2012.01)

(52) U.S. Cl.
CPC ......... *G06Q 30/0244* (2013.01); *G06Q 30/02* (2013.01); *G06Q 30/0242* (2013.01)

(58) Field of Classification Search
CPC . G06Q 30/0244; G06Q 30/0242; G06Q 30/02
See application file for complete search history.

(56) References Cited

U.S. PATENT DOCUMENTS

| 7,760,684 B2 | 7/2010 | Kadar et al. |
| 7,865,394 B1 | 1/2011 | Calloway et al. |

(Continued)

FOREIGN PATENT DOCUMENTS

WO   WO 2001/073642   10/2001

OTHER PUBLICATIONS

"Controlled infection!" Spreading the brand message through viral marketing" Angela Dobele, David Toleman, Michael Beverland", 2005.*

*Primary Examiner* — Victoria E Frunzi
(74) *Attorney, Agent, or Firm* — Crowell & Moring LLP

(57) ABSTRACT

Systems and methods for influencing an Internet-based marketing campaign are provided. An introduction panel is sent to a plurality of N generation recipients. Each respective N generation recipient that uses the introduction panel to invite N+1 generation recipients is tracked. An invitation panel is sent to the N+1 generation recipients. Which respective N+1 generation recipients use the invitation panel to perform a defined campaign action is tracked. Each respective N generation recipient is credited with N+1 generation recipients that (i) were invited to the campaign by the N generation recipient and (ii) performs a campaign action. These steps are repeated for subsequent generations N. For each N generation recipient credited during these repeated steps, each ancestor recipient that invited (i) the respective N generation recipient or (ii) another ancestor of the respective N generation recipient to the campaign is also credited.

9 Claims, 36 Drawing Sheets

Related U.S. Application Data continuation of application No. 13/424,302, filed on Mar. 19, 2012, now Pat. No. 8,417,558, which is a continuation of application No. 12/648,180, filed on Dec. 28, 2009, now abandoned, which is a continuation of application No. 11/900,589, filed on Sep. 12, 2007, now Pat. No. 8,140,376.

(60) Provisional application No. 60/918,088, filed on Mar. 15, 2007, provisional application No. 60/843,789, filed on Sep. 12, 2006.

(56) References Cited

U.S. PATENT DOCUMENTS

| | | | |
|---|---|---|---|
| 8,140,376 B2 | 3/2012 | Koonce et al. | |
| 8,417,558 B2 | 4/2013 | Koonce et al. | |
| 2002/0038256 A1* | 3/2002 | Nguyen | G06Q 30/06 705/26.1 |
| 2003/0191816 A1* | 10/2003 | Landress | G06Q 30/02 709/219 |
| 2005/0004837 A1* | 1/2005 | Sweeney | G06Q 30/02 705/14.16 |
| 2005/0216338 A1 | 9/2005 | Tseng et al. | |
| 2006/0042483 A1 | 3/2006 | Work et al. | |
| 2006/0143081 A1 | 6/2006 | Argaiz | |
| 2006/0190325 A1* | 8/2006 | Tarsh | G06Q 30/02 705/14.16 |
| 2007/0260523 A1* | 11/2007 | Schadt | G06Q 10/107 705/14.16 |
| 2007/0265915 A1 | 11/2007 | Gould et al. | |
| 2008/0091517 A1* | 4/2008 | Koonce | G06Q 30/02 705/14.42 |
| 2008/0091547 A1 | 4/2008 | Baker | |
| 2008/0133488 A1* | 6/2008 | Bandaru | G06F 17/2785 |
| 2008/0249764 A1 | 10/2008 | Huang et al. | |
| 2008/0255933 A1* | 10/2008 | Leventhal | G06Q 30/02 705/14.27 |
| 2009/0265245 A1 | 10/2009 | Wright | |
| 2009/0319372 A1 | 12/2009 | Makeev | |
| 2011/0161159 A1 | 6/2011 | Tekiela | |
| 2013/0013393 A1 | 1/2013 | Koonce et al. | |

* cited by examiner

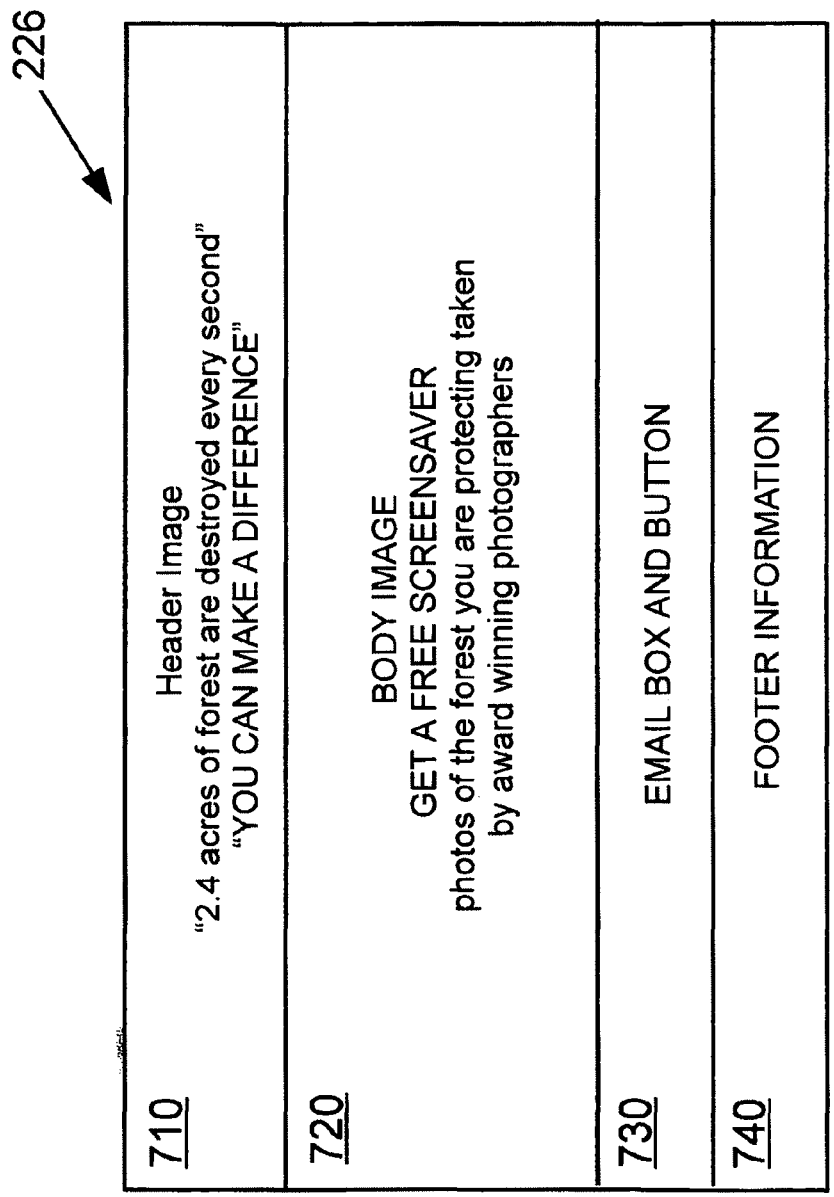

| |
|---|
| 810 |
| HEADER IMAGE |
| 820 |
| One of the biggest ways you can help the environment is by encouraging your friends to participate in earthscreen. When you get 5 friends to join you in adopting a rainforest we'll send you a $25 gift card that you can use at Vivavi an earth friendly online store.<br><br>Please select an address book below to select which friends you'd like to get involved in the quest to save some of our most valuable resources. We'll send a personal invitation so you can track which of your friends are interested also adopting your earth. |
| 830 |
| IMPORTER BUTTONS |
| 840 |
| IMPORTER COPY BOX (IF SELECTED) |
| 850 |
| SKIP THIS STEP LINK |

910 HEADER IMAGE

920
One of the biggest ways you can help the environment is by encouraging your friends to participate in earthscreen. For every friend you get to join earthscreen and adopt a forest, you will get an additional entry into the Eco Adventure Sweepstakes for a trip for two to Belize.

Please select an address book below to select which friends you'd like to get involved in the quest to save some of our most valuable natural resources. We'll send a personal invitation so you can track which of your friends are interested also adopting your earth. The more friends you invite, the more chances you'll have to win!

930 IMPORTER BUTTONS

940 IMPORTER COPY BOX (IF SELECTED)

950 SKIP THIS STEP LINK

Fig. 10

1010
HEADER IMAGE

1020
One of the biggest ways you can help the environment is by encouraging your friends to participate in earthscreen. By joining you get beautiful photographs every day of your adopted forests, all created exclusively for earthscreen by award winning artists.

Every day the images will remind you and your friends of the positive change you are making in the world.

Please select an address book below to select which friends you'd like to get involved in the quest to save some of our most valuable natural resources. We'll send a personal invitation so you can track which of your friends are interested also adopting your earth.

1030 IMPORTER BUTTONS

1040 IMPORTER COPY BOX (IF SELECTED)

1050 SKIP THIS STEP LINK

Fig. 15

Rewards – Motivate people to invite others: (these are given to those that send the invitations)

○ I will not be using any rewards.

● I have one or more rewards.

▼ Reward: free Acme aPhone    ✕ Delete

Type: [Free Product/Service ▼]

What is the value of your reward? (optional)
$ [100]

e.g. "$25 gift card, sweepstake entry, free shipping, etc.

Describe the reward.
You've earned a(n) [free Acme aPhone]
Complete the sentence above to ensure it is formatted correctly for display. ⓘ
39 characters remaining e.g. "free trip to Mexico", "$20 coupon from Amazon", "entry into our drawing", etc.

Give reward when [10] friend(s) complete the targeted action

The reward can be earned [1] time(s)

⊕ Add a reward

Company Address

The following address will be displayed at the bottom of all invitation emails in compliance with CAN-SPAM requirements.

| | |
|---|---|
| Company Name: | Acme Products |
| Address: | 1234 Main Street |
| Address: | Suite 945 |
| City: | San Francisco |
| State: | California |
| ZIP Code: | 94103 |

Keyword-Frequency 100 able all along also appetizers's best burgers but buy california certificate chicken chops christmas coupon cows dad deal delicious desserts to dinner dishes dont enjoy ever everything figured filet first food free fries gift gifts give going good got great guaranteed guys had happy has have here hope interested its just know like love loved meat might mom more next i will now one only order ordered our out really right sale save savings seafood sent side sign something special steak stuff stuffed sure thank thanks theyre thing think time tonight too tried use very want was were will wrapped youve Keywords Used in Invites

| Term | % of Messages Using | Avg. Per Invite | Total Usage |
|---|---|---|---|
| happy | 82.38 | 1.17 | 235 |
| cows | 78.28 | 1.82 | 347 |
| california | 77.05 | 1.03 | 194 |
| fries | 69.26 | 1.05 | 179 |
| ordered | 64.75 | 1.10 | 174 |
| got | 57.79 | 1.05 | 150 |
| youve | 56.56 | 1.01 | 139 |
| not | 56.56 | 1.05 | 145 |
| is | 56.56 | 1.03 | 142 |

Fig. 30

SYSTEMS AND METHODS FOR INFLUENCING MARKETING CAMPAIGNS

CROSS REFERENCE TO RELATED APPLICATIONS

This application is a continuation-in-part of U.S. patent application Ser. No. 13/858,772, entitled "System and Method for Optimization of Viral Marketing Efforts," filed Apr. 8, 2013, pending, which is a continuation of U.S. patent application Ser. No. 13/424,302, now U.S. Pat. No. 8,417,558, which is a continuation of U.S. patent application Ser. No. 11/900,589, now U.S. Pat. No. 8,140,376, which claims priority to U.S. Provisional Patent Application No. 60/918,088, filed Mar. 15, 2007 and U.S. Provisional Patent Application No. 60/843,789, filed Sep. 12, 20016. This application is also a continuation of U.S. patent application Ser. No. 12/648,180, entitled "Systems and Methods for Influencing Marketing Campaigns," filed Dec. 28, 2009. Each above-identified patent and/or patent application is hereby incorporated by reference in its entirety.

1. FIELD OF THE INVENTION

The present application relates generally to systems and methods for identifying people that disproportionately influence Internet-based marketing campaigns.

2. BACKGROUND

Many marketing systems are recognized by the marketing and advertising industry for communicating information about a product or service to potential consumers. One form of communication is "word-of-mouth" communication which is generally considered to be the passing of information by verbal means, especially recommendations, but also general information, in an informal, person-to-person manner, rather than by mass media, advertising, organized publication, or traditional marketing. While the term "word-of-mouth communication" implies a spoken form of communication, other forms of passing information between individuals are encompassed within the phrase including written forms of communication. With the advent of computer networks and in particularly the internet, web dialogue, such as blogs, message boards and e-mails are often now included in the definition of word-of-mouth communication.

"Word-of-mouth marketing" or "word-of-mouth promotion" is a term used in the marketing and advertising industry to describe activities that companies undertake to generate personal recommendations as well as referrals for brand names, products and services. Word-of-mouth promotion is highly valued by advertisers. It is believed that this form of communication has valuable source credibility. Research points to individuals being more inclined to believe word-of-mouth promotion than more formal forms of promotion methods because the receiver of word-of-mouth referrals may believe that the communicator is unlikely to have an ulterior motive (e.g.: they are not receiving an incentive for their referrals.) Also, people tend to believe people who they know. In order to promote and manage word-of-mouth communications, marketers use publicity techniques as well as viral marketing methods to achieve desired behavioral response.

"Viral marketing" and "viral advertising" refer to marketing techniques that seek to exploit pre-existing social networks to produce exponential increases in brand awareness, through viral processes similar to the spread of an epidemic. It is word-of-mouth delivered and enhanced online; it harnesses the network effect of the Internet and can be very useful in reaching a large number of people rapidly.

One perceived limitation of word-of-mouth/viral marketing is that while companies have achieved success in generating sustained viral growth for various marketing promotions, it is difficult to predict the success of a viral marketing campaign as success is often a matter of creative chance rather than mathematical or scientific principles. Furthermore, there have been limited successes in generating revenue as the direct result of specific viral marketing campaigns. To address this limitation, United States Patent Publication No. US 2008/0091517 A1 provides, inter alia, systems and methods for designing multiple user flows within a campaign, systems and methods for measuring the relative performance of user flows within a campaign, and systems and methods for rewarding participants (motivators) of campaigns that accomplish predetermined goals such as forwarding a campaign invitation to a set number of recipients.

3. SUMMARY

The present disclosure builds on the disclosure of United States Patent Publication No. US 2008/0091517 A1 by providing systems and methods for identifying people that disproportionately influence Internet-based marketing campaigns. Such people are referred to herein as influencers. In social media, influence is the ability to motivate others to take a particular action, such as engaging with a brand, passing along a message, or making a purchase. The present disclosure details systems and methods for facilitating campaigns in which each participant's level of influence is measured thereby allowing marketers to segment their audience for effective remarketing initiatives. This is accomplished by tracking the effect of each campaign participant across multiple generations. For example, consider a campaign participant (sharer) that shares a campaign message with a recipient (receiver). This sharer/receiver relationship represents one generation in which the sharer is the parent and the receiver is the child. If the child, in turn, shares the campaign message with another recipient, another parent/child relationship is formed. Further, the original sharer would be considered the grandparent of the new sharee. In the instant disclosure, these successive parent/child relationships are tracked. For each sharer (parent), the activities of each of the progeny (children, grandchildren, great-grandchildren, etc.) are tracked. If such progeny perform some desired activity, such as perform a defined campaign action (e.g., buy a product or service offered by the campaign), this defined campaign action is credited to the parent of the progeny. In this way, relationships such as the discovery that eight percent of the participants of a campaign generate forty-seven percent of the friends of the campaign are discovered. Here, the term "friends" means those campaign participants that perform a defined campaign action or otherwise add value to a campaign.

Advantageously, the metric (the influencer criteria) used to determine whether a campaign participant is an influencer can be set and adjusted by the campaign creator. This metric can be, for example, the ability to drive value, specific actions, or participation. More specifically, in some embodiments, the metric is the number of participant's progeny who participated in the campaign. In some embodiments, the metric is the number of campaign actions completed by a participant and the participant's progeny. In some embodiments, the metric is the total value generated by the participant and the participant's progeny.

The identification of campaign influencers has substantial utility. For example, consumer lists can be segmented by influence. Each such segment can be subjected to different user flows, different subsequent campaigns, or rewarded with different tiers of incentives. Moreover, consumer lists that have been segmented by influence can be exported for these and other purposes.

A segment of a campaign audience can be obtained by setting minimum and maximum influence values. To choose only top influencers, a maximum value is set to highest value (default) and minimum value is set to a desired threshold. Alternately, a view options toggle can be set to "Pie Chart", or some equivalent chart, and a minimum value can be adjusted until the selection includes the desired percentage of the total campaign participants.

Another aspect of the present disclosure is the ability to analyze consumer conversations that take place in a campaign. In a campaign, users invite others to participate in a campaign through invitations that are written out in their own words. With the present disclosure, the most frequently used terms from invitations can be ascertained. In this way key terms being used by participants in describing the campaign are determined. This provides immediate insight into the perception of the brand associated with the campaign and can be used to improve overall marketing messages. For example, terms used by campaign participants can be adopted by the campaign organizer in keyword buys and messaging.

Additional features and advantages of the invention will become apparent to those skilled in the art upon consideration of the following detailed description of a preferred embodiment exemplifying the best mode of carrying out the invention as presently perceived.

4. BRIEF DESCRIPTION OF THE DRAWINGS

Like reference numerals refer to corresponding parts throughout the several views of the drawings.

FIG. 7 is a block diagram of a third landing page utilized with the fifth and sixth user flow of FIG. 2;

FIG. 8 is a block diagram of a first invite page utilized with the first and second user flow of FIG. 2;

FIG. 9 is a block diagram of a second invite page utilized with the third and fourth user flow of FIG. 2;

FIG. 10 is a block diagram of a third invite page utilized with the fifth and sixth user flow of FIG. 2;

FIG. 15 is an interface that allows for the specification of all the gifts used in a campaign to motivate recipients to complete one or more targeted actions of the campaign;

FIG. 16 is an interface that allows for the specification of campaign rewards;

FIG. 19 illustrates a panel 1902 for uploading an image to be used as a header image;

FIG. 20 illustrates a panel for entering the text for the privacy policy and terms and conditions of a campaign;

FIG. 21 illustrates a panel for entering the company address associated with a campaign;

FIG. 30 illustrates reports on key word frequencies in invitations issued by inviters in a campaign in accordance with an embodiment of the disclosure;

5. DETAILED DESCRIPTION

Figure 1:
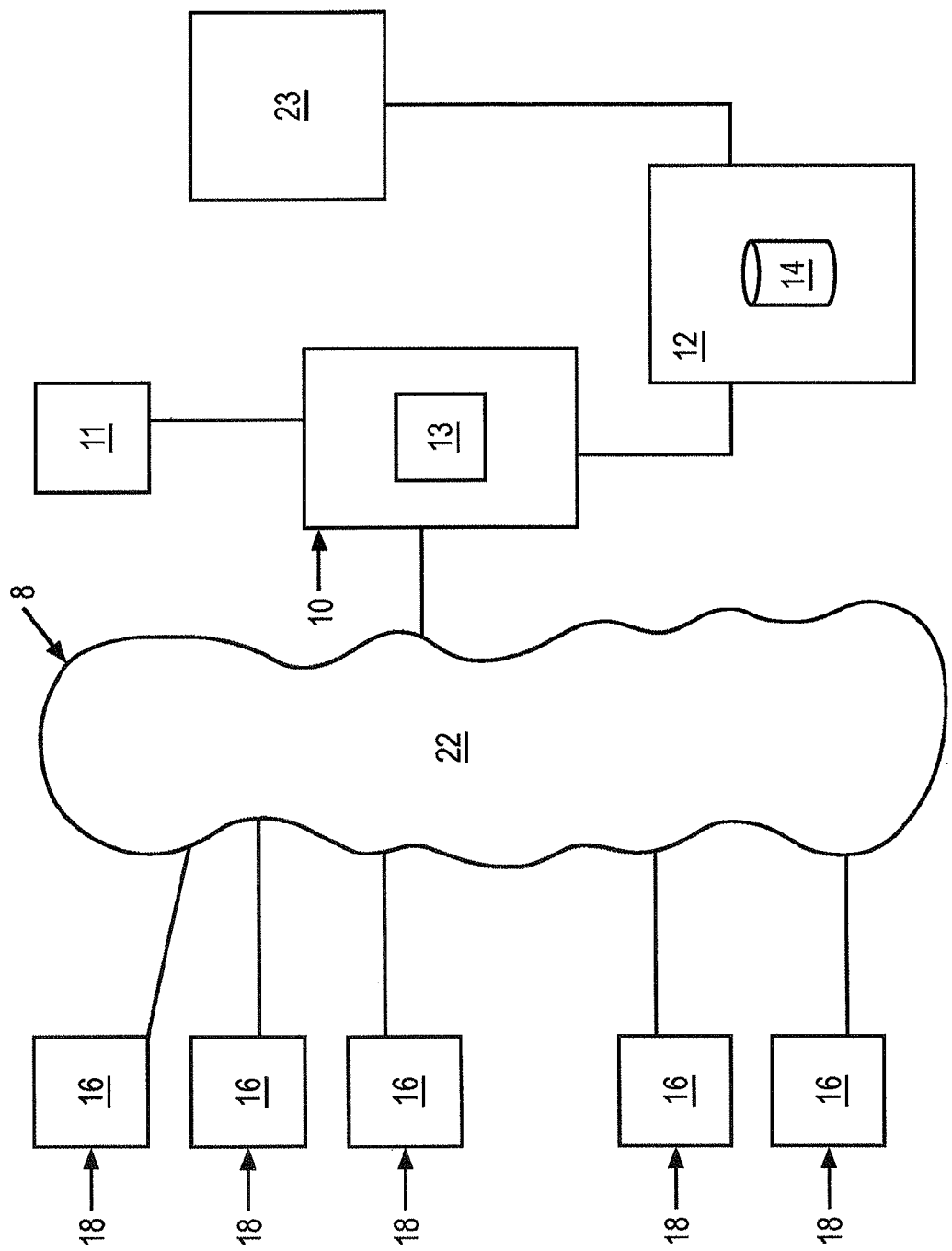
FIG. 1 is a block diagram of a system for implementing the campaigns.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present invention includes any alterations and modifications to the illustrated embodiments and includes further applications of the principles of the disclosure as would normally occur to one skilled in the art to which this invention pertains.

The disclosed system and method preferably seek to achieve one or more of three fundamental business objectives: 1) maximizing the number of participants in a program; 2) maximizing the number and/or amount of desired consumer actions for the program; and 3) minimizing the outlay required for business objectives 1 and/or 2. In order to achieve these business objectives, the disclosed systems and methods expose users to user flows, measure the virality of the user flow and the rate of completion for desired consumer actions and, based on measurements and the cost of any motivators or incentives offered to induce actions, expose user groups to updated user flows to increase or decrease virality, or increase or decrease the rate of consumers completing the desired actions. Moreover, the disclosed systems and methods identify campaign influencers. In some embodiments, the disclosed systems and methods identify and analyze participant messages in order identify useful phrases that may be used in future campaigns, modified campaigns, or advertising or other task associated with the campaign brand.

Exemplary System.

In one embodiment, the disclosed marketing system 8 and method are implemented in an Internet environment. As shown in FIG. 1, the system 8 includes a server 10 communicatively coupled to memory 12 which may include a database 14. In one embodiment, server 10 is configured to act as a host web-server for communications with web clients. Seed users 16 who may have a network connection 18 with the server 10 act to invite other users or invitees 20 (not shown) to engage in user flows of a campaign hosted by the server 10. Data stored in memory 12 and/or database 14 is accessible by an analytical suite 23. An advertiser, who may be the party implementing the server 10 and controlling the user flows or a third party wishing to gain exposure or increase sales, defines an objective for a campaign. Third party advertisers may pay the party operating the server 10 and implementing the user flows for their services.

Although only one server 10 is shown in FIG. 1, it should be understood that viral marketing optimization system 8 can include multiple server computers 10. The server computer 10 can include a personal computer, a computer terminal, a personal digital assistant (PDA) and/or other types of devices generally known to those of ordinary skill in the art.

As illustrated, the marketing system 8 includes a processor 13, a clock 11 and memory 12. The marketing system 8 can be located on a single server 10 or distributed over several servers. In one embodiment, the marketing system 8 is incorporated into one or more web servers. The processor 13 is used to control the operation of the marketing system 8. The processor 13 may be comprised of one or more components. For a multi component form of processor 13, one or more components may be located remotely relative to the others, or configured as a single unit. Furthermore, the processor 13 can be embodied in a form having more than one processing unit, such as a multi-processor configuration, and should be understood to collectively refer to such configurations as well as a single-processor-based arrangement. One or more components of the processor 13 may be of electronic variety defining digital circuitry, analog circuitry, or both. The processor 13 can be of a programmable variety responsive to software instructions, a hardwired state machine, or a combination of these.

The clock 11 is used to time events in the viral marketing optimization system 8. As should be appreciated, the clock 11 can be incorporated into the processor 13 or can be a stand-alone component. Further, the clock 11 can be hardware and/or software based. Among its many functions, the memory 12 in conjunction with the processor 13 is used to store data regarding the effectiveness of various user flows of the campaign. The memory 12 can include one or more types of solid state memory, magnetic memory, or optical memory, just to name a few. By way of nonlimiting example, the memory 12 can include solid state electronic random access memory (RAM), sequential access memory (SAM), such as first-in, first-out (FIFO) variety or last-in, first-out (LIFO) variety, programmable read only memory (PROM), electronically programmable read only memory (EPROM), or electronically erasable programmable read only memory (BEPROM); an optical disc memory (such as a DVD or CD-ROM); a magnetically encoded hard disc, floppy disc, tape, or cartridge media; or a combination of these memory types. In addition, the memory 12 may be volatile, non-volatile, or a hybrid combination of volatile, non-volatile varieties. The memory 12 may further include removable memory which can be in the form of a non-volatile electronic memory unit, optical memory disk (such as a DVD or CD-ROM); a magnetically encoded hard disk, floppy disk, tape, or cartridge media; or a combination of these or other removable memory types.

The network 22 can include the Internet, one or more other wide area networks (WAN), a local area network (LAN), a proprietary network, an institutional network, a cable television network, a public switched telephone network (PSTN), a combination of these, and/or other types of networks generally known to those skilled in the art. In one embodiment of the disclosed system 8, the network 22 includes the Internet.

The seed users 16 and invitees 20, collectively referred to as users, access the marketing system 8 through client devices 18. The client devices 18 and the server 10 of the marketing system 8 communicate with one another by sending signals across the network 22. In one form, these signals can include Simple Mail Transfer Protocol (SMTP), HyperText Mark Up Language (HTML) pages, Extensible Mark Up Language (XML) pages, and other types transmission protocols. For example, the server 10 can send a signal corresponding to an e-mail with an embedded URL and a web page form across the network 22 to the client devices 18.

The user with client 18 can click on the URL and be presented with the associated webpage which may include a form, fill out the form and send a signal corresponding to the filled-out form across the network 22 to the server 10. By way of non-limiting examples, the clients 18 can include personal computers, both fixed and portable; computer terminals; PDA's; cellular telephones, land line based telephones and the like; television systems, such as televisions, television-based web browsers, digital video recorders, analog video recorders, cable boxes, cable modems, direct broadcast satellite (DBS) boxes, digital versatile disc (DVD) players and video game systems; home entertainment systems, such as stereo equipment, MP3 players, and the like; sound production equipment; video/movie production equipment; or a combination these components, to name a few examples. As shown, the client devices 18 are operatively coupled to the server 10 over the network 22. It should be appreciated that the client devices 18 can be operatively coupled to the server 10 through hardwired and/or wireless connections. The client devices 18 are hardwired and/or have software that allows the client devices 18 to communicate over the network 22. In one embodiment, the client devices 18 are personal computers with software that can include e-mail applications, web browsers, chat programs, and/or proprietary software.

User Flows.

Figure 2:
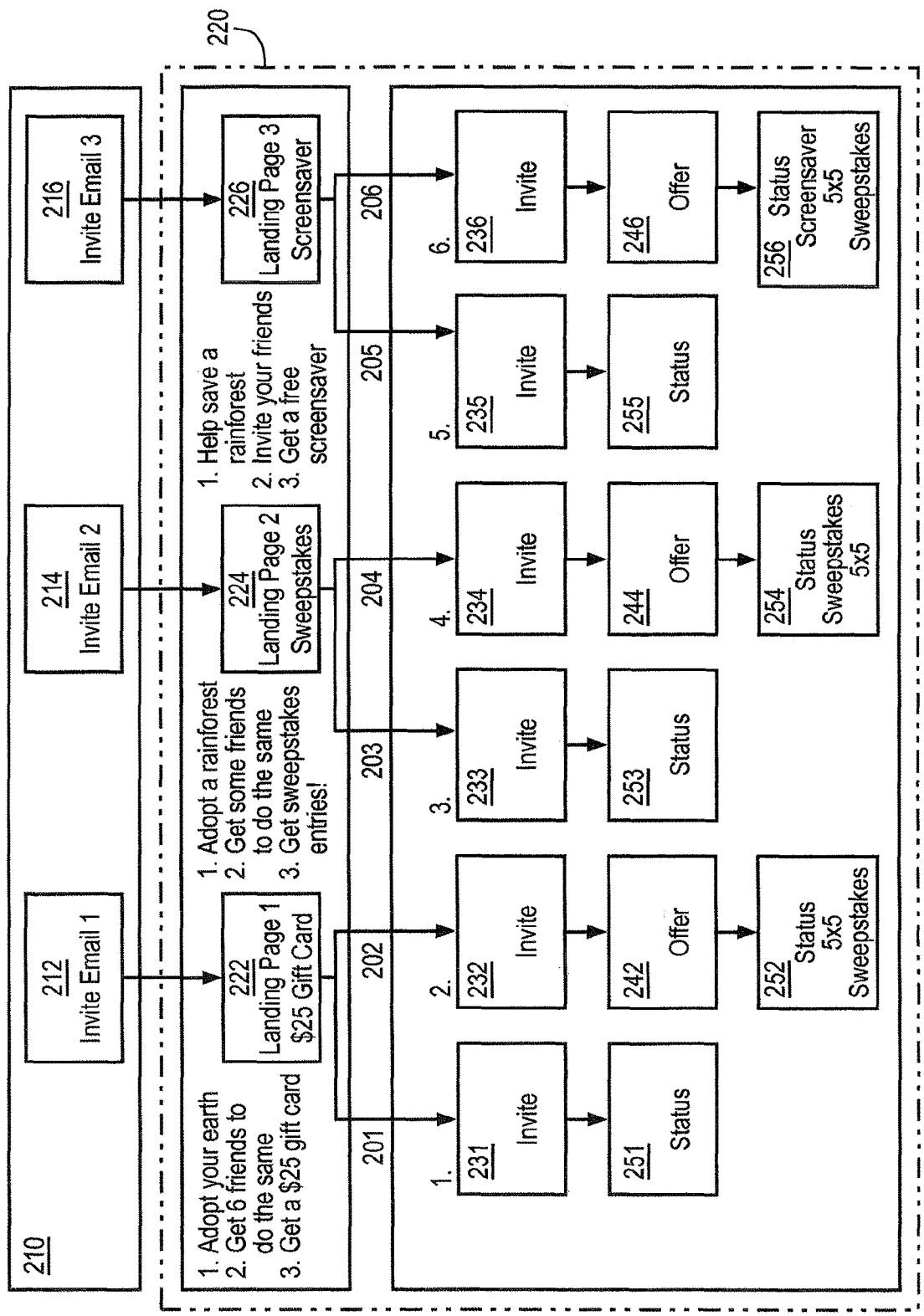
FIG. 2 is a block diagram of six user flows of a campaign process.

In some embodiments, campaigns consist of one or more user flows. Each user flow comprises a number of attributes that can be varied and include motivators, actions and an invitation processes, web process, and communication process. FIG. 2 illustrates the relationship of the attributes of six user flows 201, 202, 203, 204, 205 and 206. In general, each user flow 201-206 is initiated by an invitation process 210 which is the primary business process for exposing users to user flows 201-206. Illustratively, the invitation process is initiated by one or more "seed" users. Each user (seed or other) is made an "offer" with the intention of adequately motivating that user to participate in some desired process such as, for example, a web process or processes.

The invitation process is defined by the user flow definition. E-mail is one possible medium used to initiate the invitation process. As shown, for example in FIG. 2, three invitation e-mails 212, 214 and 216 are utilized to initiate the six user flows 201-206. The first invitation e-mail 212 is configured to direct a user to a first landing page 222 which provides a first motivator, illustratively, a twenty five dollar gift card, as an inducement to get the user to perform actions. The second invitation e-mail 214 is configured to direct a user to a second landing page 224 which provides a second motivator, illustratively, sweepstakes entries, as an inducement to get the user to perform actions. The third invitation e-mail 216 is configured to direct a user to a third landing page 226 which provides a third motivator, illustratively, a screen saver, as an inducement to get the user to perform actions. It is within the scope of the disclosure for more or less than six user flows to be conducted and for more or less than three invitation e-mails and landing pages to be utilized in the invitation process 210.

While the description below focuses generally on the cost of the motivators and the actions requested during the user flow as the attributes which may change between various user flows, there are many other attributes that may be modified. For example, in some embodiments, the invitation e-mail has a subject line as one attribute, body text that identifies the desired action and motivator as well as possibly some inspirational language, a mechanism for accessing the user flows (e.g. a hyper-text link to a landing page) and possibly even graphics. Data may be collected to establish the effectiveness of each of these attributes in generating the desired user interactions and based on this data, any one or more of these attributes may be modified in the user flow to improve the viral marketing program, including placement, emphasis and other aspects of these attributes.

FIG. 2 depicts e-mail as the media for initiating the invitation process 210, however, it is within the scope of the disclosure for other media to be used to initiate the invitation process 210. Examples of other media which may be utilized to initiate the invitation process 210 are websites, mobile technologies (cellular, Blackberry, etc.), internet phone (Skype), social networking sites (Myspace), instant messaging (Yahoo!IM, AIM, etc.), etc. Each of these media and other non-disclosed media may serve as a communication utility by which acquaintances can be sent generic messages. Additionally, as mentioned above, other media may be utilized to implement the user flow.

Figure 3:
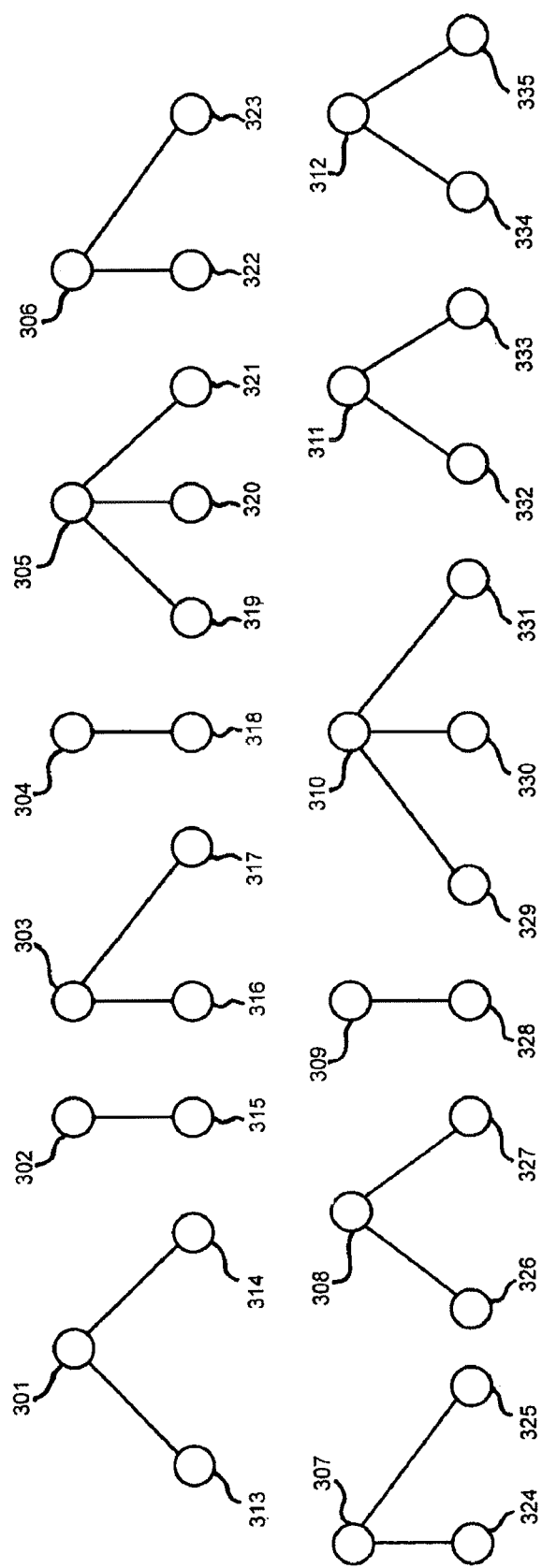
FIG. 3 is a relational diagram of twelve seed users each inviting one to three invitees into a campaign.
Figure 4:
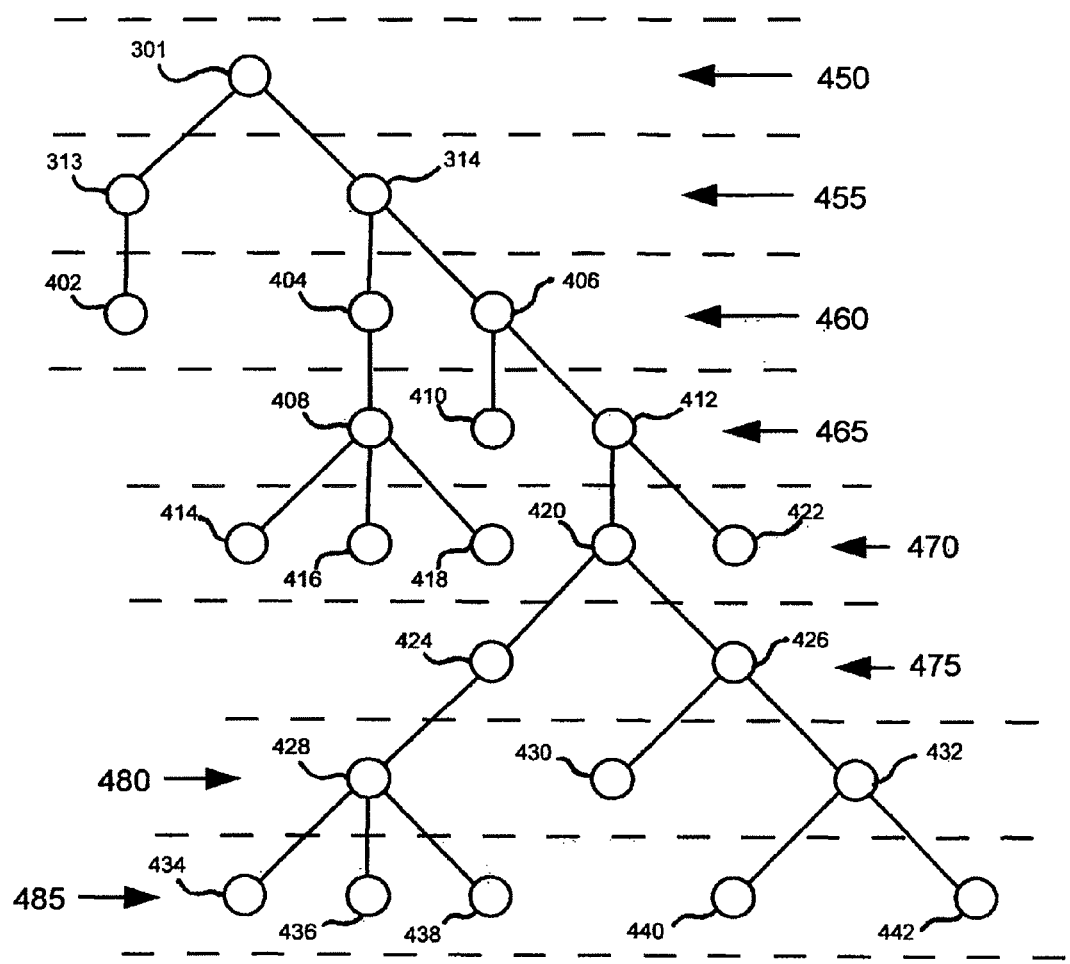
FIG. 4 is a relational diagram of the parent child relationship between a single seed user, the seed user's invitees and invitees invited by other invitees of a campaign.

As shown for example in FIGS. 3 and 4, the invitation process can result in multiple users being invited to participate in different user flows of a campaign. FIG. 3 illustrates a hypothetical invitation process in which each of twelve seed users 301-312 is shown inviting between one to three people or invitees 313-335. Illustratively, seed user 301 invites invitees 313 and 314, seed user 302 invites invitee 315, seed user 303 invites invitees 316 and 317, seed user 304 invites invitee 318, seed user 305 invites invitees 319-321, seed user 306 invites invitees 322 and 323, seed user 307 invites invitees 324 and 325, seed user 308 invites invitees 326 and 327, seed user 309 invites invitees 328 seed user 310 invites invitees 329-331, seed user 311 invites invitees 332 and 333 and seed user 312 invites invitees 334 and 335. However, as shown, for example, in FIG. 4, each invitee may act as a seed user by inviting additional invitees.

Following the above example, FIG. 4 illustrates that the invitees 313 and 314 of seed user 301 may act as seed users to invite people they know, who may, in turn, invite the people they know, the invitation process may be represented as parent-child relationships that span many generations. The process begins with a first generation 450 seed user 301 (top node) who, as explained above, invites two second generation 455 invitees 313 and 314 to participate in the user flow. Invitee 313 may then act as a seed user and invite another invitee 402 to participate in the user flow. Additionally, invitee 314 may act as a seed user and invite invitees 404 and 406 to participate in the user flow. Thus, invitees 402, 404 and 406 form a third generation 460. Illustratively, invitee 404 acts as a seed user to invite invitee 408 to participate in the user flow. Additionally invitee 406 acts as a seed user to invite invitees 410 and 412 to participate in the user flow. Invitees 408, 410 and 412 form a fourth generation 465. Invitee 408 illustratively acted as a seed user to invite invitees 414, 416 and 418 to participate in the user flow. Additionally invitee 412 acted as a seed user to invite invitees 420 and 422 to participate in the user flow. Invitees 414, 416, 418, 420 and 422 form a fifth generation 470. Illustratively, invitee 420 was the only fifth generation user to act as a seed user and invite invitees 424 and 426 to participate in the user flow. Invitees 424 and 426 form a sixth generation 475. Invitee 424 acted as a seed user to invite invitee 428 to participate in the user flow. Illustratively invitee 426 acted as a seed user to invite invitees 430 and 432 to participate in the user flow. Invitees 428, 430 and 432 form a seventh generation 480. Invitee 428 acted as a seed user to invite invitees 434, 436 and 438 to participate in the user flow. Additionally invitee 432 acted as a seed user to invite invitees 440 and 442 to participate in the user flow. Invitees 434, 436, 438, 440 and 442 form an eighth generation 485.

Returning to FIG. 2, the motivator in one embodiment is a reward provided to the user for fulfilling the action. Motivators usually consist of a prize, such as a gift card, cash, product, or sweepstakes, but can also include non-tangible items such as the desire to feel important. Tangible motivators typically have a cost associated therewith. As mentioned previously, the motivators in the illustrated example are a gift card, sweepstakes entries to win a prize and a free screen saver. One purpose of the user flows 201-212 is to help determine which motivators are most effective in inducing users to complete the desired actions. Some motivators may be highly effective in inducing users to perform a first action but totally ineffective in inducing a second action, while a second motivator may be highly effective in inducing users to perform the second action but less effective in inducing users to perform the first action. Thus, for each motivator, separate user flows may be conducted to determine the effectiveness of the motivator to induce users to perform different actions. Additionally, some motivators may be highly effective in inducing almost any action but be so costly that it is not desirable to offer these motivators in particular user flows.

One or more pre-defined consumer actions may be required to be accomplished by an invitee user in order for the invitee user to receive the motivator. Required actions could include registering at a site, clicking a link in an e-mail, sending a certain number of e-mails to friends, or getting a certain number of friends to register with the viral marketing system. As used herein "friend" should be interpreted broadly. Friend may include anyone with whom a user is familiar or knows how to contact.

The web process 220 utilized in one embodiment of the user flows includes a sequenced selection of web pages. The web process 220 includes a number of web pages with varying elements, as well a desired order of the web pages. There can be any number of web pages (defined by the attributes of the page). Users most often reach the web process 220 through an invitation e-mail, such as invitation e-mails 212, 214 and 216 sent in the invitation process 210. In one embodiment, the pages most used in the web process 220 include one or more landing pages 222, 224 and 226, one or more invite pages 231, 232, 233, 234, 235 and 236, one or more offer pages 242, 244 and 246 and one or more status pages 251-256. As shown, for example, in FIG. 2, an invitation e-mail 212, 214 or 216 is sent by a seed user to an invitee to notify the invitee about an offer that is available to the invitee. For non-seed users this invitation e-mail 212, 214 or 216 is sent from another user for whom the recipient is an acquaintance. Illustratively, the invitation e-mail 212, 214 or 216 includes a hyperlink that points to a landing page 222, 224 or 226. In alternative embodiments, the hyperlink may be included, for example, on a seed users page on social networking site or may be sent in an instant message to an invitee.

Figure 5:
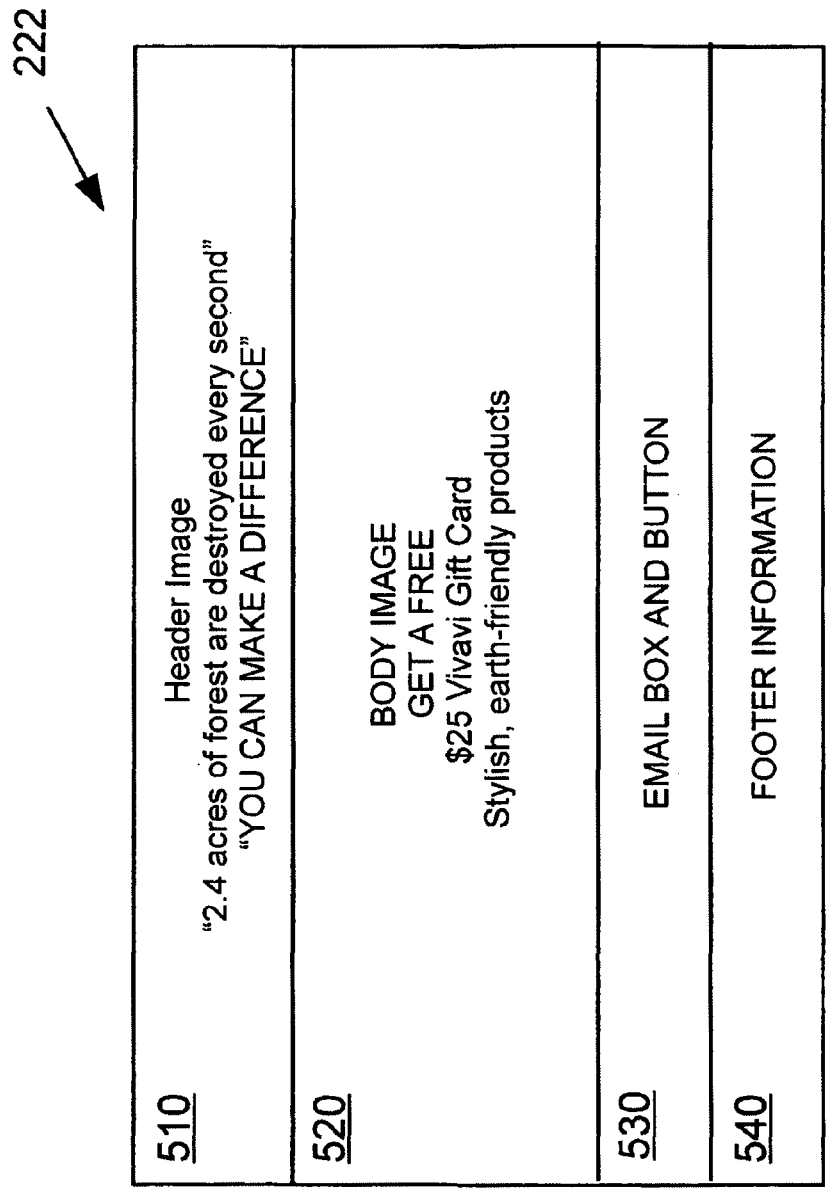
FIG. 5 is a block diagram of a first landing page utilized with the first and second user flow of FIG. 2.
Figure 6:
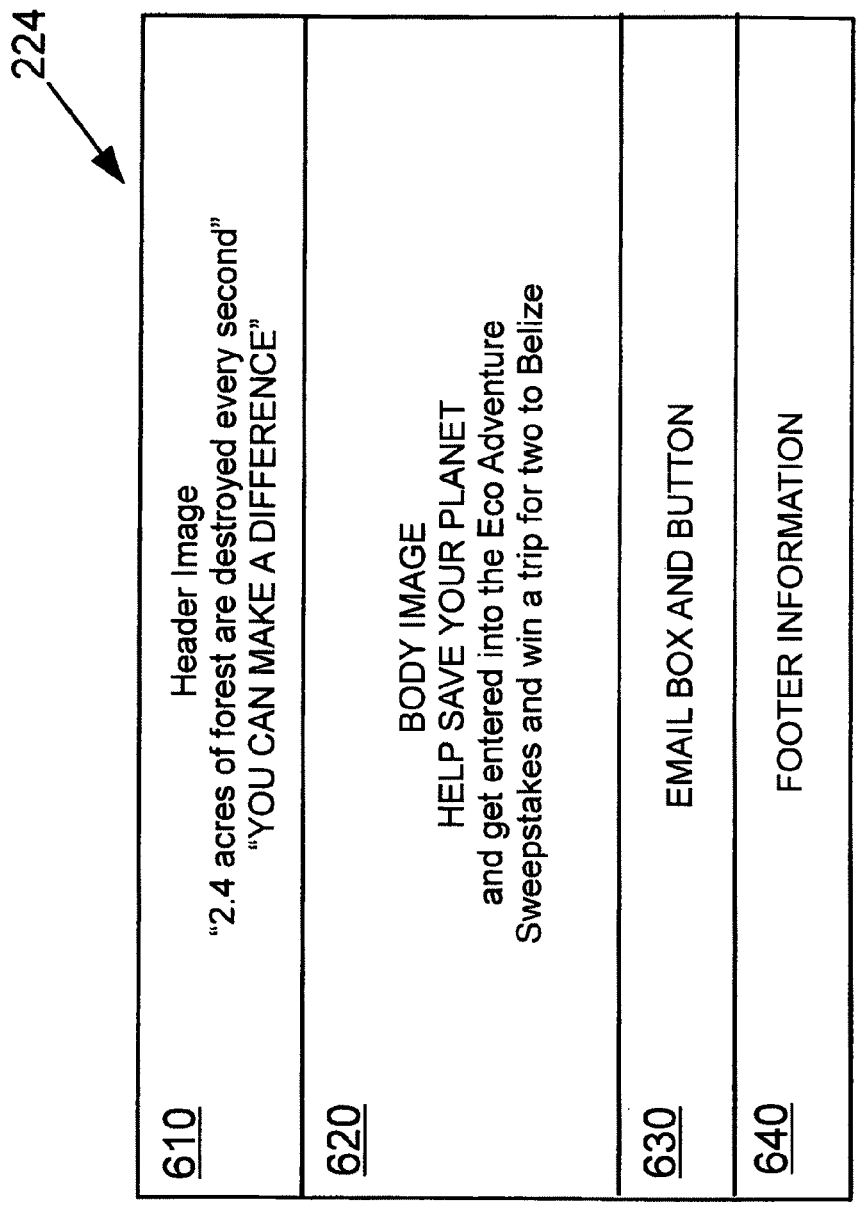
FIG. 6 is a block diagram of a second landing page utilized with the third and fourth user flow of FIG. 2.

The landing page 222, 224, 226 is used to present the invited user with an "offer," e.g. the motivator, and explain the action that must be completed to receive the offer. The landing page may also be utilized for other purposes within the scope of the disclosure, including, but not limited to, collecting personal information, e.g. the e-mail address of the user. As, shown, for example, in FIGS. 5-7, each landing page may include a header image frame 510, 610, 710, a body image frame 520, 620, 720, e-mail box and button frame 530, 630, 730 and footer information frame 540, 640, 740. Since each of the illustrated landing pages 222, 224, 226 is to be used in user flows to determine the effectiveness of a motivator to induce an invitee to perform an action or actions to benefit a specific target beneficiary, each header image frame 510, 610 and 710 contains the same image and information. In the disclosed example, the target beneficiary of the viral marketing is an environmentalism entity and thus the header image frame 510, 610, 710 may include an environmental message, e.g. "2.4 acres of forest are destroyed every second. You can make a difference." The presentation contained in the header image frame 510, 610, 710 is another of the attributes of the user flows that may be changed or presented differently in the various user flows so that efforts can be made to optimize the content of the header image frame 510, 610, 710.

In some embodiments, each landing page 222, 224 and 226 also contains identical e-mail box and button frame 530, 630, 730 to facilitate collection of personal information such as the e-mail address of the invitee. It is within the scope of the disclosure for landing pages 222, 224, 226 to include other non-illustrated information acquisition frames in addition to or instead of e-mail box and button frame 530, 630, 730, such as frames that facilitate the collection of personal information such as household income, sex, race, age or other demographic information or telephone numbers, home address, e-mail, work address, work telephone number or other contact information from the invitee.

Each landing page 222, 224, 226 may also include footer information 540, 640, 740. Footer information may include text or graphics that can be varied between user flows in an effort to optimize the viral marketing program. Alternatively, footer information may contain advertising which may be utilized as one income generation method for the party operating the server and or implementing and controlling the attributes of the various user flows.

The landing pages 222, 224 and 226 are differentiated by the contents of the body image 520, 620, 720. As shown, for example, in FIG. 5, the landing page 222 accessed by users invited by first invitation e-mail 212 to participate in either the first user flow 201 or second user flow 202 contains a body image frame 520 that states "GET A FREE $25 Vivavi Gift Card. Stylish, earth-friendly, products." As shown, for example, in FIG. 6, the landing page 224 accessed by users invited by second invitation e-mail 214 to participate in either the third user flow 203 or fourth user flow 204 contains a body image frame 620 that states "HELP SAVE YOUR PLANET and get entered into the Eco Adventure Sweepstakes and win a trip for two to Belize." As shown, for example, in FIG. 7, the landing page 226 accessed by users invited by third invitation e-mail 216 to participate in either the fifth user flow 205 or sixth user flow 206 contains a body image frame 720 that states "GET A FREE SCREENSAVER Photos of the forest you are protecting taken by award winning photographers." Thus, body image frames 520, 620, 720 serve to identify the motivator that is to be tested by the user flows 201-206.

In some embodiments, body image frame 520, 620, 720 is a clickable frame that will direct the user's web browser to the appropriate invite page for the user flow in which they are participating. Thus, clicking on the body image frame 520 would direct an invitee who accessed landing page 222 via invitation e-mail 212 to either invite page 231 for the first user flow or invite page 232 for the second user flow.

The invite page 231-236 is used to present the invited user with invitation process facilitation tools. For the illustrated example, in which e-mail is the media utilized during the invitation process 210, invite pages 231-236 provide the tools necessary for invitees to send acquaintances invitation e-mails. As shown, for example, in FIGS. 8-10, invite pages 231-236 may be similar to invite pages 800, 900, 1000 and thus include header image frames 810, 910, 1010, information frames 820, 920, 1020, importer button frames 830, 930, 1030, importer copy box frames 840, 940, 1040 and skip this step link frames 850, 950, 1050. The importer button frames 830, 930, 1030, importer copy box frames 840, 940, 1040 and skip this step link frames 850, 950, 1050 may be identical in each of the illustrated invite pages 800, 900, 1000. The importer button frames 830, 930, 1030 typically contain well known tools, or links to such tools, for importing an address book from another application while the importer copy box frames 840, 940, 1040 typically are configured to display the imported address book. The header image frames 810, 910, 1010 may be the same in each of the invite pages 800, 900, 1000 or may be an attribute that can be modified to optimize the viral marketing program and thus be different between at least two user flows.

The information frames 820, 920, 1020 act to differentiate the invite pages 800, 900 and 1000 from one another and thus, in the illustrated example, are attributes which may be tested. In one embodiment, invite page 800 may serve as the invite page 231, 232 accessed via landing page 222 by invitees who received invitation e-mail 212 who participate in the first user flow 201 or the second user flow 202. Thus, information frame 820 may contain a message like:

> One of the biggest ways you can help the environment is by encouraging your friends to participate in earth-screen. When you get 5 friends to join you in adopting a rainforest, we'll send you a $25 gift card that you can use at Vivavi, an earth friendly online store.
>
> Please select an address book below to select which friends you'd like to get involved in the quest to save some of our most valuable natural resources. We'll send a personal invitation so you can track which of your friends are interested in also adopting your earth.

Thus, invite page 800 identifies both the motivator, e.g. a twenty-five dollar gift card from an environmentally friendly store, and the action, e.g. adopting the rainforest and getting five friends to adopt the rainforest, that is required to receive the motivator in the first and second user flows 201, 202.

In one embodiment, invite page 900 may serve as the invite page 233, 234 accessed via landing page 224 by invitees who received invitation e-mail 214 who participate in the third user flow 203 or the fourth user flow 204. Thus, information frame 920 may contain a message like:

> One of the biggest ways you can help the environment is by encouraging your friends to participate in earth-screen. For every friend you get to join earthscreen and adopt a forest, you will get an additional entry into the Eco Adventure Sweepstakes for a trip for two to Belize.
>
> Please select an address book below to select which friends you'd like to get involved in the quest to save some of our most valuable natural resources. We'll send a personal invitation so you can track which of your friends are interested in also adopting your earth.

Thus, information frame 920 of invite page 900 identifies both the motivator, e.g. an entry into a sweepstakes for a trip to a country with a rainforest, and the action, e.g.: adopting the rainforest and getting a friend to adopt the rainforest, that is required to receive the motivator in the third and fourth user flows 203, 204.

In one embodiment, invite page 1000 may serve as the invite page 235, 236 accessed via landing page 226 by invitees who received invitation e-mail 216 who participate in the fifth user flow 205 or the sixth user flow 206. Thus, information frame 1020 may contain a message like:

> One of the biggest ways you can help the environment is by encouraging your friends to participate in Earth-screen. By joining you get beautiful photographs every day of your adopted forests all created exclusively for Earthscreen by award winning artists.
>
> Every day the images will remind you and your friends of the positive change you are making in the world.
>
> Please select an address book below to select which friends you'd like to get involved in the quest to save some of our most valuable natural resources. We'll send a personal invitation so you can track which of your friends are interested in also adopting your Earth.

Thus, information frame 1020 in invite page 1000 identifies both the motivator, e.g. beautiful photographs via a screen saver, and the action, e.g. joining Earthscreen, that is required to receive the motivator in the fifth and sixth user flows 205, 206. It should be noted that the motivator and the action differ between the various invite pages 810, 910, 1010, allowing the motivator and actions to be attributes that may be tested, in the illustrated embodiment, to optimize the viral marketing campaign.

As shown, for example in FIG. 2, the web process 220 in some user flows, illustratively the second user flow 202, the fourth user flow 204 and the sixth user flow 206, includes presenting an offer page 242, 244, 246 to the invitee. Via this offer page, the user is offered a product or service, usually for a fee. The web process 220 in some user flows, such as, for example, the first user flow 201, the third user flow 203 and the fifth user flow 205, will not include such an offer page. The presentation or lack of presentation of an offer page during a user flow may have a beneficial impact on the success of the user flow and may thus is an attribute, in the illustrated embodiment, that be measured to help determine the optimal viral marketing scheme for a specific product or service.

Figure 11:
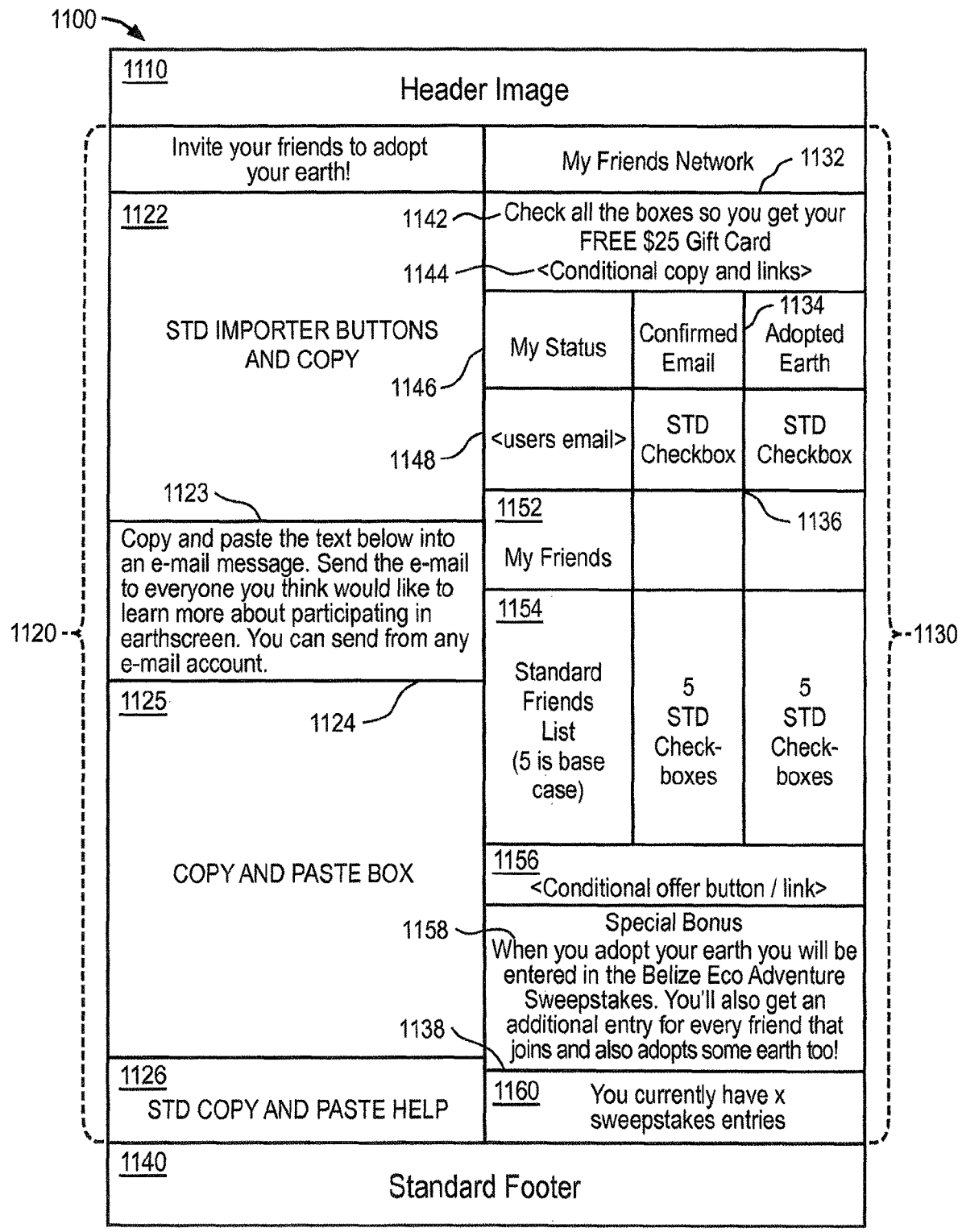
FIG. 11 is a block user flow of a status page utilized with the first and second user flow of FIG. 2.

The web process 220 may include presenting a user with a status page 251-256 that may be used to view whether the user's invitees took requisite actions. FIG. 11 illustrates an exemplary status page 1100 configured for presentation as the status page 251 in the first user flow 201 or status page 252 in the second user flow 202. After reading the foregoing, it will be apparent that status pages 252-256 will be similar to, but differ in some details related to the motivator and the action, to status page 1100. Status page 1100 includes a header image frame 1110, an invitation tools window 1120, an actions status window 1130 and a standard footer frame 1140.

The header image frame 1110 and the standard footer frame 1040 may be the same in various embodiments of the status page and contain information and graphics reflective of the purpose of the user flow, the entity benefiting from the user flow or other information. It is within the scope of the disclosure for the header image frame and the standard footer frame 1040 to differ between various user flows and for data to be collected providing some indication of the effectiveness of each variation.

The invitation tools window 1120 includes tools to facilitate sending invitations to friends or persons in a user's network of contacts. In an embodiment of the disclosed system and method wherein the invitation process utilizes invitation e-mails as the invitation medium, such as that illustrated in FIG. 2, the invitation tools window 1120 is an e-mails tool window that provides tools that facilitate sending invitation e-mails. Thus, as shown, for example, in FIG. 11, invitation tools window 1120 may include a standard importer buttons and copy frame 1122, a copy and paste frame 1124 and a standard copy and paste help frame 1126. Standard importer buttons and copy frame 1122 contains standard tools to facilitate importing an address book or individual e-mail addresses from another application. Copy and paste box frame 1124 illustratively includes an instruction box 1123 that includes instructions advising the user that other e-mail accounts may be utilized to send invitation e-mails to invitees and a text box 1125 which may contain text of an appropriate invitation e-mail. Standard copy and paste help frame 1126 includes standard help tools to facilitate generation of invitation e-mails.

It is within the scope of the disclosure for the status page 1100 to include other invitation tool windows that contain tools that will facilitate carrying out the invitation process utilizing media other than e-mails. For example, tools may be provided for providing links and approved invitation text and graphics on a user's blog page or within a user's instant message program.

Actions status window 1130 includes various frames configured to provide the user with information regarding the status of user and the user's progress toward completing the action or actions required to receive the motivator. As shown, for example, in FIG. 11, actions status window 1130 includes an informational frame 1132, a user completed action frame 1134 and an invitee completed action frame 1136. Additionally, informational frame 1132 may include a special bonus frame 1138.

Illustrated informational frame 1132 includes a motivator identification text 1142 and a link 1144 to conditional copy and links. In the illustrated example, the motivator identifications text 1142 states "Check all boxes to get your Free $25 Gift Card" since the illustrated status page is an example of a status page to be used with the first user flow 201 or second user flow 202 both of which offer a twenty-five dollar gift card as the motivator. The link displays the appropriate text depending upon whether certain conditions are satisfied. For example, if all conditions for redemption of the motivator have not been satisfied, the link causes text to be displayed that contains an imbedded hypertext link to the offer. In the illustrated embodiment, if the redemption conditions have not been met the link 1144 generates the text and hypertext link "You need just x more friends to join and Adopt the Earth," where x is the number still required and Adopt the Earth is a clickable hypertext link that will direct the user's browser to the offer page. If all of the conditions for redemption of the motivator have been met, the link 1144 will cause text and a hypertext link to be present to facilitate redemption of the motivator by the user. In the illustrated example, the text and hypertext link are "Congratulations! Click here to get your gift card," where Click here is a clickable hypertext link that will direct the user's web browser to a Redemption page for the gift card.

User completed action frame 1134 is divided into columns and rows with the first row being a title bar 1146 identifying the information displayed therebelow and the second row being an information display frame 1148. In the illustrated embodiment, the title bar 1146 includes the text "My Status" in a first column, "Confirmed e-mail" in a second column and "Adopted Earth" in a third column. The first column of the information display frame 1148 includes the e-mail address provided by the user at the time of acceptance of the invitation. The second column of the information display frame 1148 includes a standard conditional check box. If the user has not confirmed their e-mail address, a clickable blinking unchecked checkbox is displayed in the second column of the information display frame 1148 which when clicked directs the user's browser to a page, frame, drop down box, pop-up box, etc. wherein the user can enter the information required to confirm the e-mail address. If the user has confirmed the e-mail, the second column of the information display frame 1148 displays a standard checked check box. In the adopt earth column of the second row of the information display frame 148, a standard check box appears that is checked if the user has completed the standard offer and is a flashing and unchecked if The invitee completed action frame 1136 includes a title bar 1152 in a first row, an information display frame 1154 in a second row and a conditional offer button/link 1156 in the third row. Since in the illustrated embodiment, the user's invitees must also confirm their e-mail and adopt the earth, the first and second rows are divided into as many columns as the user completed action frame 1134. The title bar includes text stating "My Friends" in the first column and nothing in the second and third columns since the text in the second and third columns of the title bar 1146 of the user completed action frame 1134 can act to identify the information displayed in the second and third columns of the information display frame 1148. The first column of the information display frame 1154 in the illustrated embodiment includes a standard friends list identifying the invitees of the user. The user's invitees may be identified by their e-mail addresses or by some other identifier information such as nicknames associated with the invitee in an e-mail address book imported from another application by the user at the time of acceptance of the invitation. The second column of the information display frame 1154 includes a standard check box for each of the friends in the list of friends in the first column. For each listed friend, the standard checkbox is unchecked if the friend has not confirmed the friend's e-mail address and checked if the friend has confirmed the friend's e-mail. The third column of the information display frame 1154 includes a standard check box for each of the friends in the list of friends in the first column. For each listed friend, the standard checkbox is unchecked if the friend has not adopted the earth and checked if the friend has adopted the earth. It is within the scope of the disclosure for other presentations to be utilized to keep the user informed of their status toward completing all of the actions required to receive the motivator, such as, for example, sending the user an e-mail each time an action is completed which e-mail may also indicate the actions remaining to be completed before the user is entitled to receive the motivator.

As shown, for example, in FIG. 11, special additional incentives may be offered to an invitee to induce further efforts by the invitee above the minimum effort required to receive the basic motivator. For example, in the disclosed embodiment, in the second user flow 202 in addition to awarding the user a gift card after five invitees have been sent invitations and adopted the earth, the user may be provided with a sweepstakes entry for each invitee who adopts the earth. Therefore, as shown, for example, in FIG. 11, the informational frame 1132 may include a special bonus frame 1138 providing information about this special offer. The special bonus frame 1138 may include a first box 1158 informing the user of the conditions of the special bonus offer and an update box 1160 that updates the user on their progress with regard to the special bonus. In the illustrated embodiment, the update box 1160 contains text stating "You currently have x sweepstakes entries" where x is the number of entries and the user gets one entry for every friend that completes the offer.

As shown, for example, in FIG. 2, the special bonus is not offered in the first, third and fifth user flows 201, 203 and 205, but is offered in the second, fourth and sixth user flows 202, 204 and 206. Thus, Status page 1100 is an exemplary status page 252 for the second user flow 202. In one example, the status page for the first user flow 201 will be nearly identical to status page 1100 but will not include the special bonus frame 1138. The status pages 253, 254, 255, 256 for the third, fourth, fifth and sixth user flows, 203, 204, 205 and 206, respectively, may be similar to status page 1100 but include information in the actions status window 1130 to accurately communicate the user's progress toward completion of the required actions to receive the motivator and any special bonus for those user flows.

The status page is only one form of a communication sub-process of the disclosed web process 220. The communication sub-process is used to supplement the invitation process 210 and the web process 220 and remind users of their status, such as whether the user's invitees have completed the requisite actions, or whether the user has completed the required actions to receive a motivator. As mentioned above, this communication sub-process may be carried out using other methods and devices such as by sending the user update e-mails.

Figure 12:
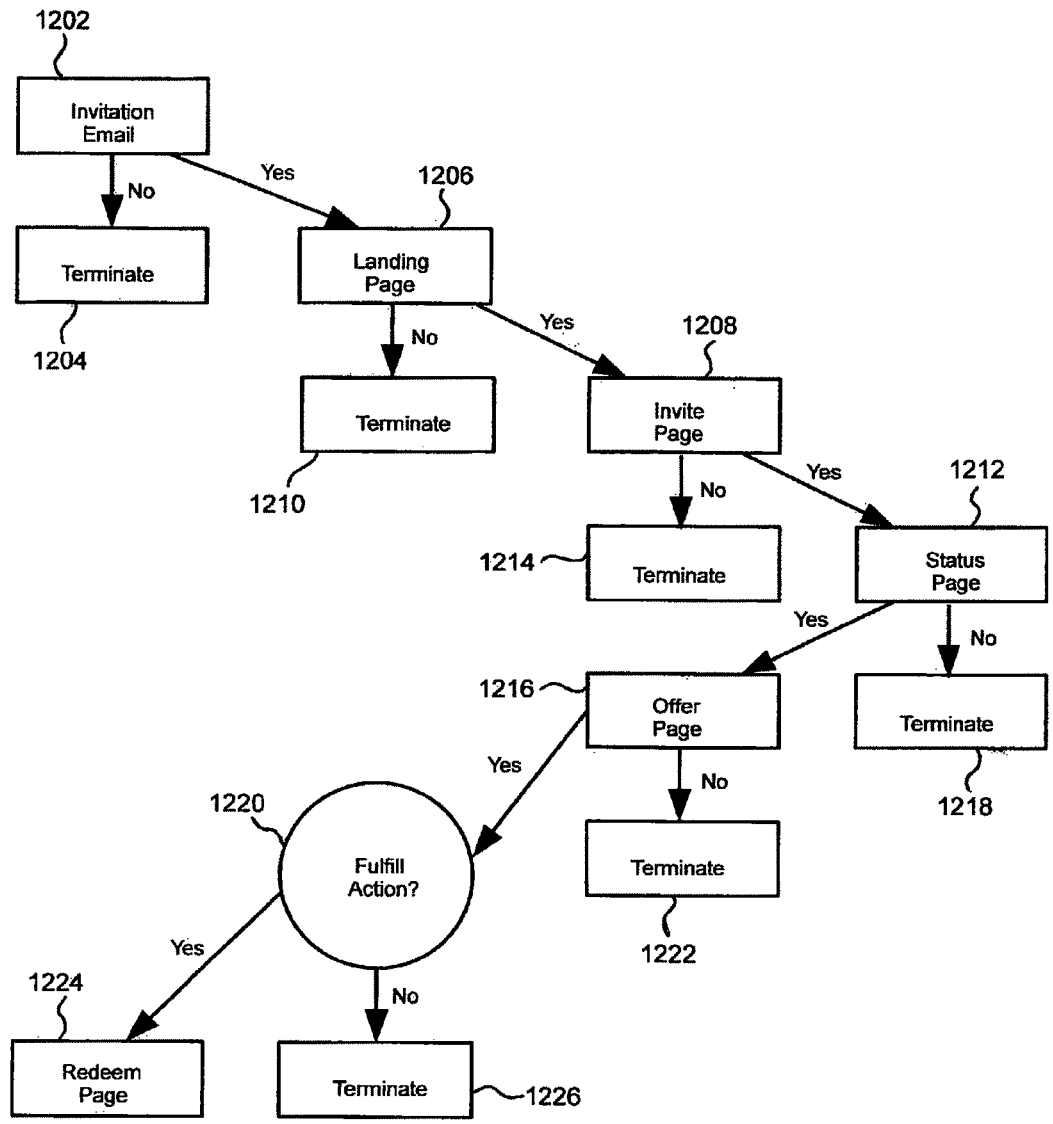
FIG. 12 is a binary decision tree representing a simplified user flow for e-mail and web mediums.

The data acquired in the various user flows is independent of the mediums used in the invitation process 210 and the client. The data accumulated and stored in the marketing server 10 aids in optimizing the campaign. The various web pages disclosed above and any other media utilized to implement the user flows may contain appropriate links to a user flows database 12 to store the appropriate data in database. The salient features of the data are the parent-child relationships, the User flow Code specifying the user flow that the customer or user was presented, and a number of Event Codes which describe a customer's traversal through the user flow. By the term event code, it is meant that some data is collected and/or stored that indicates that an event, such as opening an e-mail, sending an invitation, clicking on a link, registering for the program, etc, has occurred. This data may be stored in many different formats, thus, it should be understood that while some formats for data storage of event codes is described herein that such data formats are not exclusive and should not be considered limiting unless otherwise specified. A simplified user flow for e-mail and web mediums is shown for example in FIG. 12. FIG. 12 depicts a binary decision tree which may be used to represent any user flow utilizing an invitation e-mail, as shown, for example, in FIG. 2.

As shown for example in FIG. 12, the method of optimizing a campaign includes an invitation step 1202 in which an invitee is invited by an existing user or seed member to participate in a campaign user flow via an invitation e-mail containing a link to a landing page. If the invitee elects to not participate by failing to click the link on the invitation e-mail, the process is terminated in step 1204. Alternatively, the invitee may accept the invitation by clicking on the link and proceeding to the landing page 1206 for registration. As shown, in Table 1 below, declining the invitation can be represented in binary fashion by the code 000000 which may be assigned event code 1, whereas acceptance of the invitation can be represented by binary code 100000 which may be assigned event code 2. Upon accepting the invitation, the invitee is presented with a landing page 1206 whereby the invitee may register with the system. Registration can be represented by binary code 10000 which may be assigned event code 3. If an invitee elects to register, the registered invitee may then act as a seed member and thus proceeds to an invite page 1208 configured to facilitate invitation of acquaintances. Election to invite acquaintances can be represented by binary code 111000 which may be assigned event code 4. If the invitee elects to not register with the system, the process is terminated in step 1210 and no event code is assigned to this action. The statement that "no event code is assigned" is shorthand for indicating that as a result of the termination of the process the data and event code will be finalized indicating that the user completed the previous step (assigned 110000), but not the current step (assigned 111000), and thus they remain at the previous step and the event code for completing that previous step is event code 3. Thus, while stated herein as "no event code is assigned" for failure to complete a step, in actuality the same event code is retained as the previous step.

If the user elects to invite acquaintances, the user may then be presented with a status page in step 1212 which page contains a link to an offer page. If the user elects to not invite acquaintances, the process is terminated in step 1214 and no event code is assigned to this action. When the user clicks on the link to the offer in status page, the user is transferred to the offer page in step 1216. The action of clicking on the link to the offer page can be represented by binary code 111100 and assigned event code 5. If the user does not click on the link to the offer page, no event code is assigned and the process is terminated in step 1218. When presented with the offer page, the user can elect to purchase the product or service and proceed to the fulfill action step 1220 or elect to not purchase the product or service and have the process terminated in step 1222. Acceptance of the offer can be represented by binary code 111110 which may be assigned event code 6. If the user fulfills the action requirements of the user flow, the redemption step 1224 then occurs wherein the user is presented with a redemption page. Otherwise the process is terminated in step 1226. Completion of the action requirement can be represented by binary code 111111 which may be assigned event code 7.

| Binary String | Event Code | Description (Last Step) |
| --- | --- | --- |
| 000000 | 1 | Click Link 1 (e.g. invitation declined) |
| 100000 | 2 | Click Link 1 (e.g. invitation accepted) |
| 110000 | 3 | Registered |
| 111000 | 4 | Invite |
| 111100 | 5 | Click Link 2 |
| 111110 | 6 | Complete Offer |
| 111111 | 7 | Complete Action |

The invitation process 210 is fundamental to user flow in any media. The invitation process 210 shown in FIG. 13 is not media specific and therefore demonstrates that the user flow for any particular media is a manifestation of the invitation process, possibly requiring different web processes and different nomenclature depending on the media.

Figure 13:
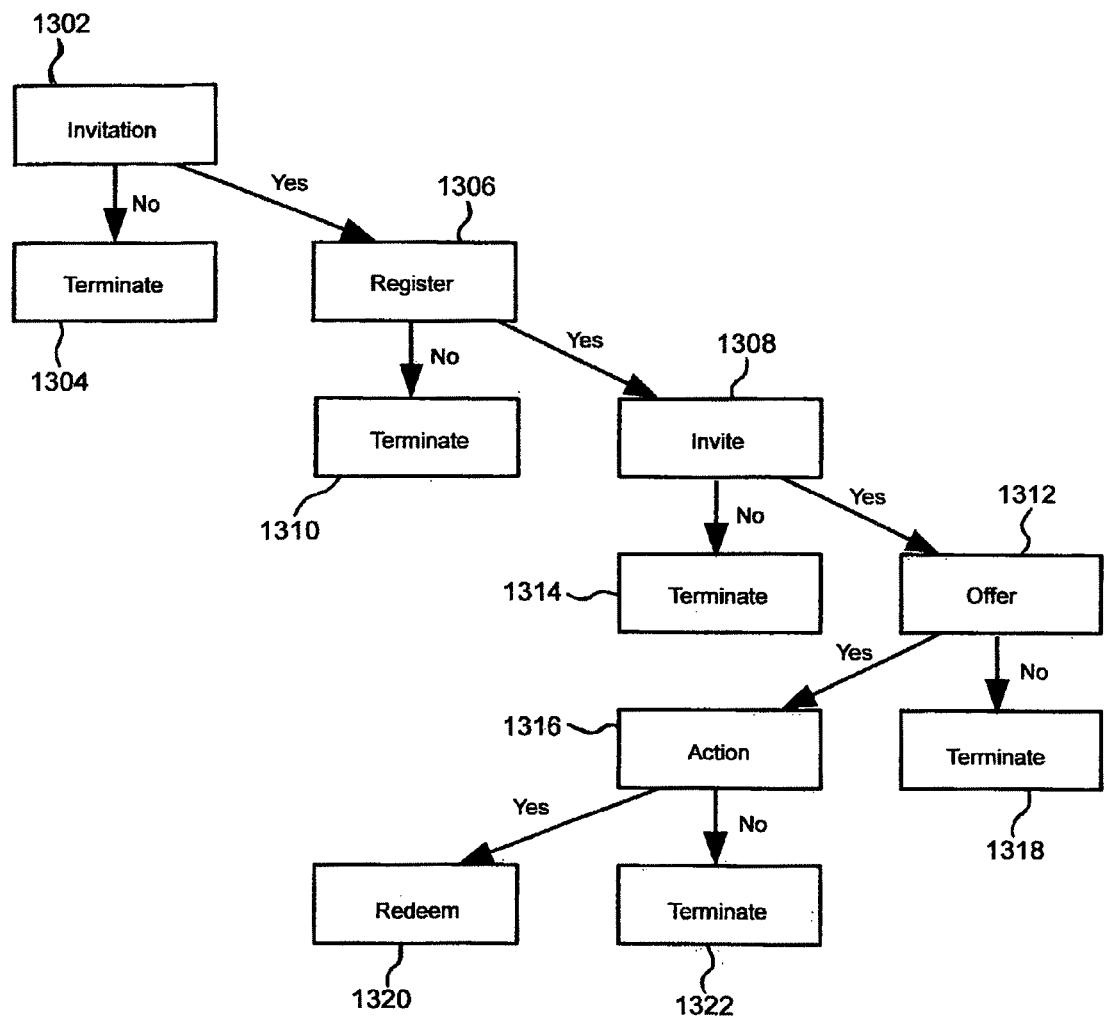
FIG. 13 is a binary decision tree of an invitation process.

FIG. 13 demonstrates the flow in a process in which the invitation process 210 is implemented utilizing a media other than e-mail. The method of optimizing viral marketing includes an invitation step 1302 in which an invitee is invited by an existing user or seed member to participate in a viral marketing user flow. As shown, in Table 2 below, declining the invitation terminates the process in step 1304, which termination can be represented in binary fashion by the code 00000 which may be assigned event code 1. Acceptance of the invitation can be represented by binary code 10000 which may be assigned event code 2. Upon accepting the invitation, the invitee is presented with a registration step 1306 whereby the invitee may register with the system. Registration can be represented by binary code 11000 which may be assigned event code 3. If an invitee elects to register, the registered invitee may then act as a seed member and is thus proceeds to an invitation step 1308. Election to invite acquaintances can be represented by binary code 11100 which may be assigned event code 4. If the invitee elects to not register with the system, the process is terminated in step 1310 and no event code is assigned to this action. If the user elects to invite acquaintances, the user may then be presented with an offer in step 1312 to purchase products or services. If the user elects to not invite acquaintances, the process is terminated in step 1314 and no event code is assigned to this action. When presented with the offer, the user can elect to purchase the product or service and proceed to the action step 1316 or elect to not purchase the product or service and have the process terminated in step 1318. Acceptance of the offer can be represented by binary code 11110 which may be assigned event code 5. If the user fulfills the action requirements of the user flow, the redemption step 1320 then occurs, otherwise the process is terminated in step 1322. Completion of the action requirement can be represented by binary code 11111 which may be assigned event code 6.

| Binary String | Event Code | Description (Last Step) |
|---|---|---|
| 000000 | 1 | Invitation declined |
| 100000 | 2 | Invitation accepted |
| 110000 | 3 | Registered |
| 111000 | 4 | Invite |
| 111110 | 5 | Complete Offer |
| 111111 | 6 | Complete Action |

Table 1 has seven Event Codes and Table 2 has six. For any media, additional Event Codes may be needed to support user flow flows in that medium, e.g. Event Code=5 in Table 1. Moreover, the steps in the invitation process may adopt names that are native to the media, e.g. Event Codes=1 & 2 in Table 2.

Creating a Campaign.

The process for creating a new campaign involves determining what campaign action participants in the campaign are to complete (e.g. make a purchase, sign up for a newsletter, watch a video, etc.), what gifts, if any, are provided to campaign participants to share with their friends (e.g. 10% off discount, buy one get one free code, etc.), what rewards will be given, if any, to those users who get their friends to participate (e.g. $25 gift card, entry into a sweepstakes, free shipping, etc.), and what styles (e.g. fonts, colors) and images will be used for this campaign. In some embodiments, a create campaign tool is provided to assist with the construction of a campaign. In some embodiments, the create campaign tool comprises an essentials module, a template module, a user flow module, an integration module, and a confirmation and publish module.

Essentials Module.

The essentials module of the create campaign tool is used to specify the fundamentals of the campaign, including the campaign name, company URL, information about the company associated with the campaign, the campaign action that is the focus of the campaign, and any incentives to be used by the campaign to encourage participation in the campaign.

In some embodiments, the campaign name that is used in the subject line and body of the e-mails that welcome participants to the campaign and that update them on the activity of their friends. For example, in some embodiments, once participants opt-in to a campaign, they will receive an email welcoming them to the campaign with the subject line "Welcome to the CAMPAIGN NAME".

In some embodiments, the Company Name is used as the "from" field for the emails that welcome participants to the campaign and that update them on the activity of their friends. In some embodiments, the company URL is used to provide a link for participants to the website of the company associated with the campaign on their Status page.

Figure 14:
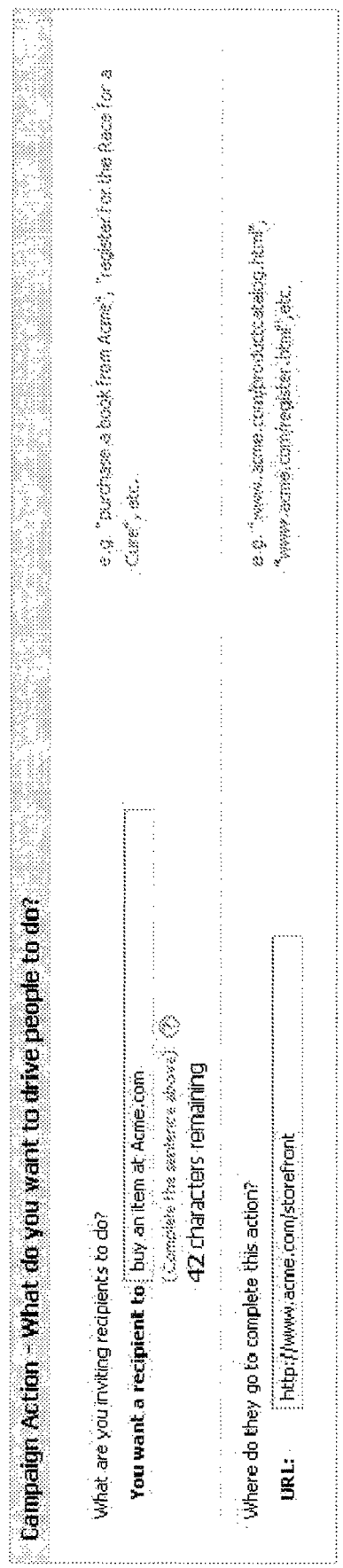
FIG. 14 is an interface that allows for the specification of defined campaign actions to be taken in a campaign.

Referring to FIG. 14, in some embodiments the essentials module provides an interface that allows for the specification of the defined campaign actions that are to be completed in the campaign. Examples of campaign actions include, but are not limited to, making a purchase, watching a video, registering for a newsletter, etc. In some embodiments, to specify the campaign action, the sentence "You want a recipient to _____" is completed using the interface illustrated in FIG. 14. This configures the system to properly describe this action to participants on their status page and in emails that update them on the activity of their friends. Additionally, in some embodiments and as illustrated in FIG. 14, the URL of the page where participants can complete this action is specified. In some embodiments, when campaign recipients click through the invitation, they will land on the page specified by the URL.

Figure 15:
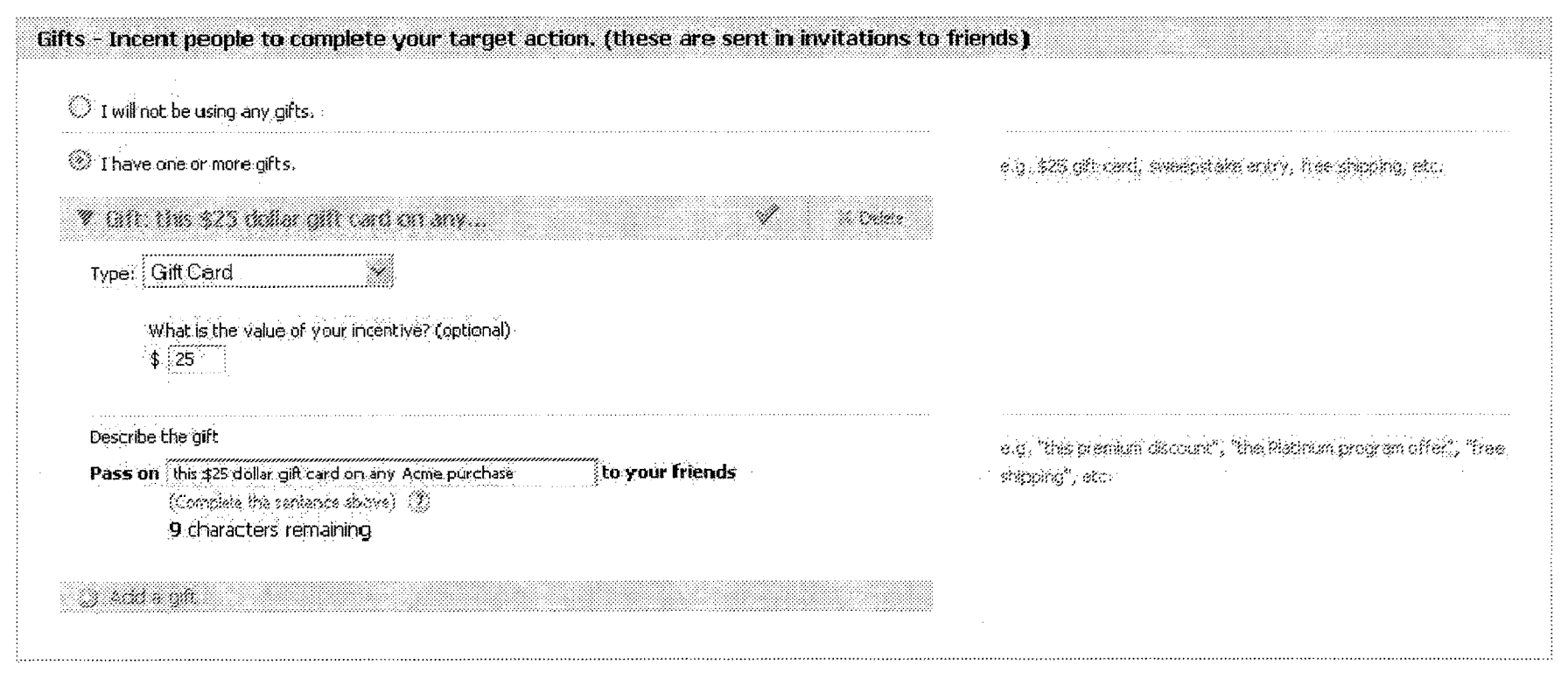

Referring to FIG. 15, in some embodiments, the essentials module provides an interface that allows for the specification of all the gifts used in a campaign to motivate recipients to complete the targeted action. An example of a gift would be to provide recipients with a code for a fifteen percent discount on any purchase they make on your site. Using gifts is optional, but if they are included, there is no limit to the number of gifts that may be specified. In some embodiments, different gifts are assigned to different campaign flows. Referring to FIG. 15, to include a gift in a campaign, in some embodiments, the depicted interface allows for the selection of the appropriate option from the group consisting of "I will not be using any gifts." and "I have one or more gifts." If the decision to include gifts in a campaign is made, additional information is needed for each gift. In some embodiments, this additional information comprises a gift type, e.g., "Coupon/Discount", "Free Product/Service", "Gift Card", or "Sweepstakes") an optional gift value for the gift that is specified as either a dollar value or a percent discount (if applicable), and a gift description. The interface depicted in FIG. 15 allows a campaign developer to describe the give by completing the sentence: "Pass on _____ to your friends". This allows the system to properly describe this gift in the headline of share panels used in some embodiments of the disclosed campaign. Referring to FIG. 15, for each additional gift to be offered, the campaign developer simply clicks on the "Add a gift" link and repeats the steps described above.

Referring to FIG. 16, in some embodiments the essentials module provides an interface that allows for the specification of campaign rewards. These rewards are used to motivate inviters to share the campaign with their friends. One example of a reward would be to give a $50 gift certificate to inviters who get three of their friends to make a purchase on a website designated by the campaign. Using rewards is optional. However, if they are included, there is no limit to the number of rewards that can be made. In some embodiments, a reward is assigned to specific user flows.

Referring to FIG. 16, the exemplary interface allows for the specification of whether or not a campaign will offer rewards by providing the options "I will not be using any rewards." And "I have one or more rewards." If rewards are included in a campaign, additional information is needed in order to specify the awards. In some embodiments, this additional information includes an award type (e.g., "coupon/discount", "free product/service", "gift card", "sweepstakes", etc.), an optional award value either a dollar value or a percent discount, and an award description. In some embodiments, as illustrated in FIG. 16, the campaign designer can specify the award description by completing the sentence: "You've earned a(n) _____". Provision of this information allows the system to properly describe the reward on the status page and in the emails that update participants on the activity of their friends.

Referring to FIG. 16, if rewards are used, a reward requirement is specified. Inviters will earn the reward when they get the specified number of friends to complete the specified campaign action. In the embodiment illustrated in FIG. 16, the campaign designer specifies a number between 1 and 99. Referring to FIG. 16, if rewards are used, a reward limit is specified (e.g., any number between 1 and 99). The interface illustrated in FIG. 16 allows for any number of additional rewards to be specified by clicking on the "Add a reward" link and specifying the information described above for the additional rewards.

Template Module.

Figure 17:
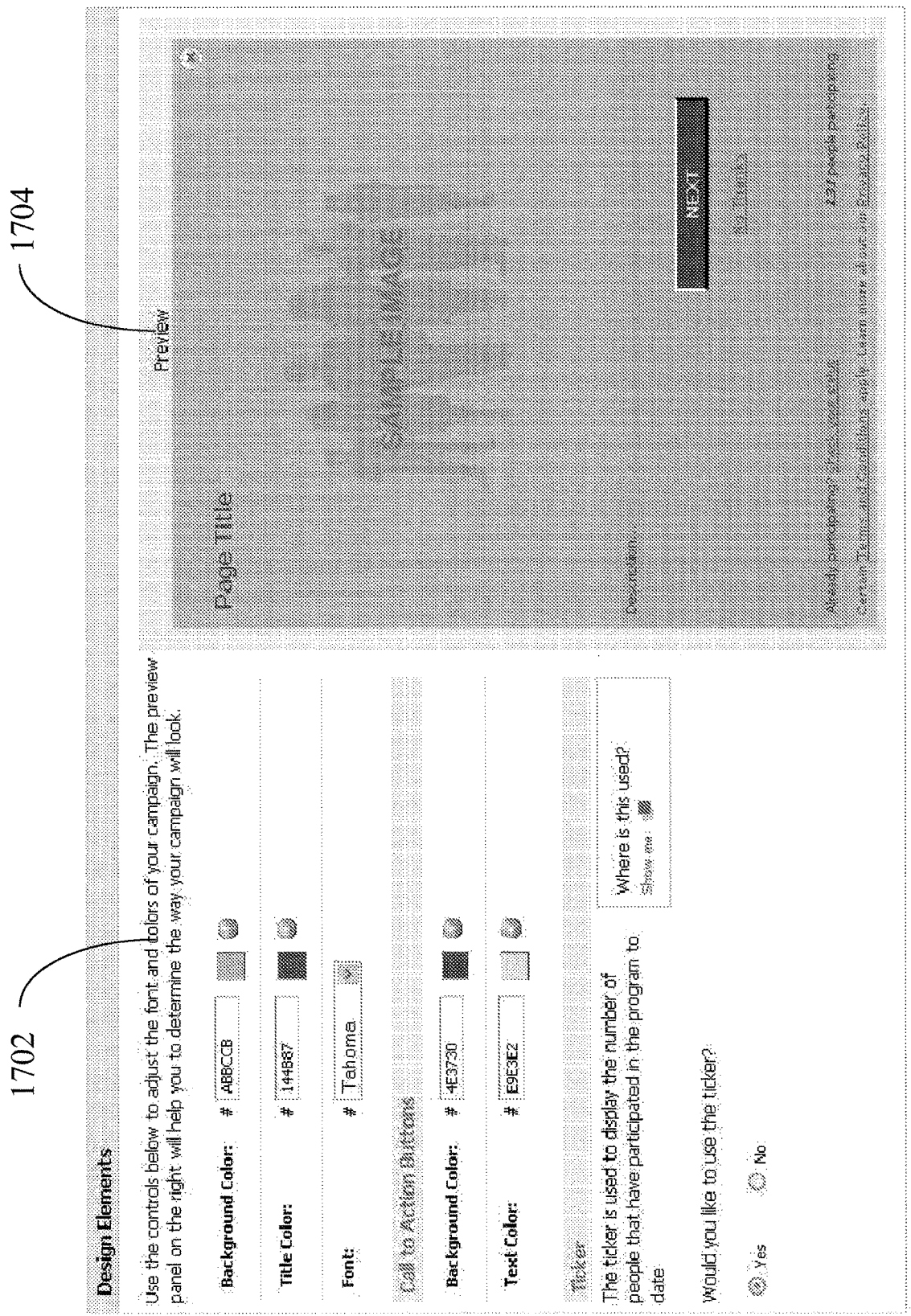
FIG. 17 illustrates a templates module that allows a campaign designer to specify the colors and fonts that will be used throughout a campaign.

Referring to FIG. 17, a panel 1702 of the templates module allows a campaign designer to specify the colors and fonts that will be used throughout the campaign. As the campaign designer modifies settings in the template module, the preview pane 1704 to the right of the panel 1702 can be viewed to understand the impact of the modified setting on the look and feel of the campaign. Using the interface depicted in FIG. 17, a background color can be specified as a hex value (or a color picker can be used by clicking on the palette) to specify the background color used on all of the panels in the campaign. Further, a headline color can be specified as any hex value (or by using the color picker by clicking on the palette) to specify the color for the headline copy used on all of the panels and the text of the emails in the campaign. Further, using the interface depicted in FIG. 17, a font to be used for all the text in the campaign can be specified (e.g., Choose from Arial, Courier, Tahoma, Times, Verdana, etc. can be selected using the drop-down menu.). Further, using the interface depicted in FIG. 17, a "Call to Action Buttons Background Color" can be specified using any hex value (or the color picker can be used by clicking on the palette) to specify the background color used on the call to action buttons used on inviter and recipient panels as well as in campaign invitations. This color is also used as a highlight color for the name of the inviter on the recipient panel in some embodiments. Further, using the interface depicted in FIG. 17, a "Call to Action Buttons Text Color" can be specified as any hex value (or by using the color picker by clicking on the palette) to specify the color for the text of the call to action buttons used on the inviter and recipient panels. Further, using the interface depicted in FIG. 17, an optional ticker can be specified. The optional ticker indicates the number of people that have participated in the campaign. If this feature is included, it will only display after the campaign has reached a threshold number of participants (e.g., at least 1000 participants).

Figure 18:
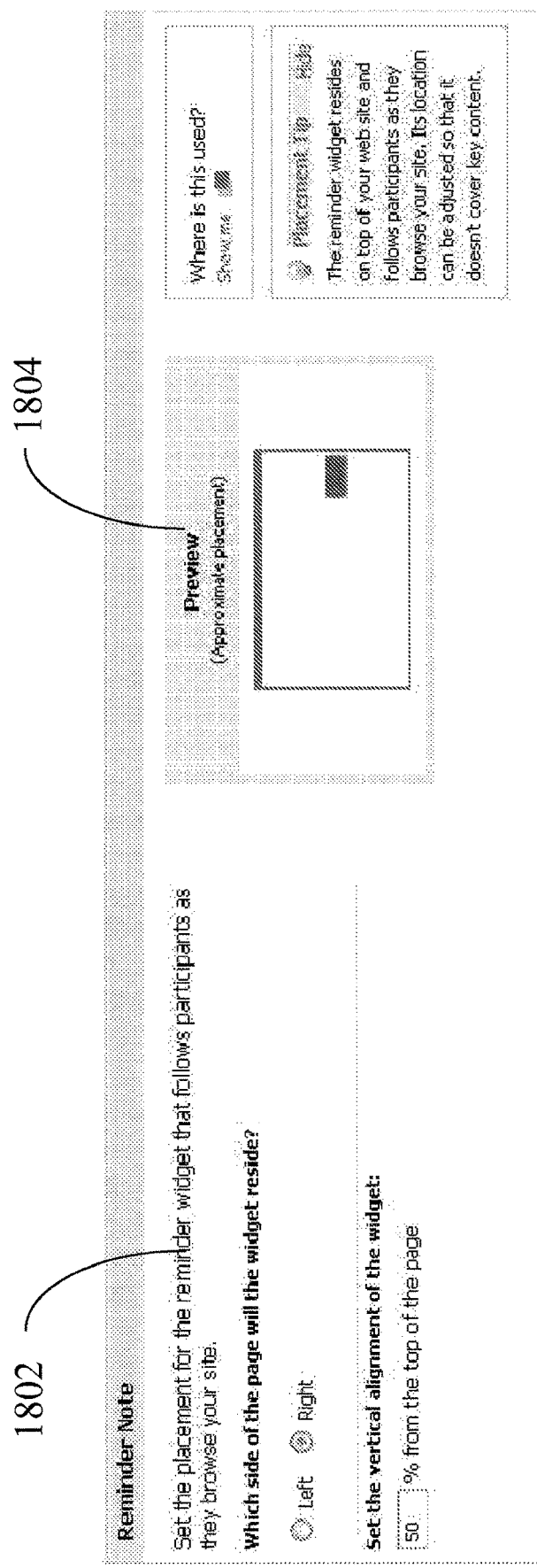
FIG. 18 illustrates a panel that enables a campaign designer to determine the placement of a reminder note.

In some embodiments, when recipients click through a campaign invitation, they will see the recipient panel in a light box above the website designated by the campaign (the website of the campaign start site). In some embodiments, if the recipient chooses to participate, a small note will remain above their website to remind them about the campaign. Referring to FIG. 18, the placement of this reminder note can be specified by a panel 1802 provided by the template module. The campaign designer can choose whether the reminder will be on the left or the right of the campaign start site and the vertical placement (defined as a percentage from the top of the page). The preview panel 1804 to the right of panel 1802 can be used to understand how these settings will affect the placement.

Figure 19:
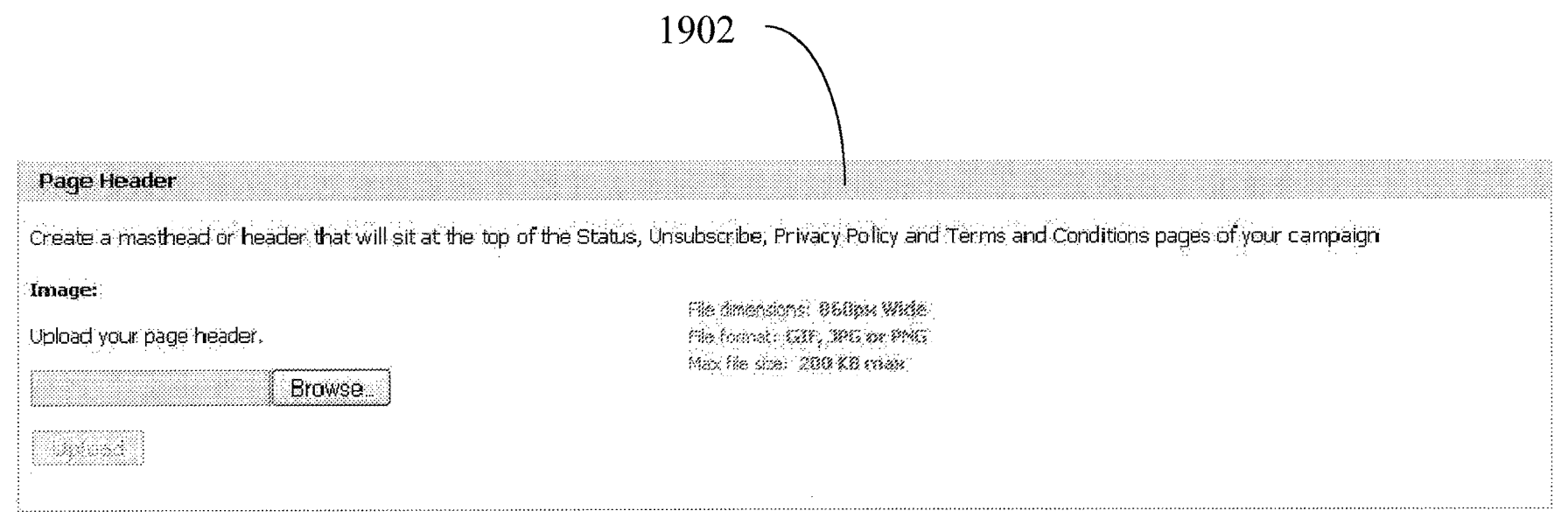

In some embodiments, a campaign comprises four pages: a status page, an unsubscribe page, a privacy policy page, and a terms and conditions page. In some embodiments, each of these pages uses the colors and fonts that were defined in the design elements section described above and contains a header image (e.g., 860 pixels wide) at the top. Referring to FIG. 19, in some embodiments, the template module provides a panel 1902 for uploading an image to be used as the header image.

Figure 20:
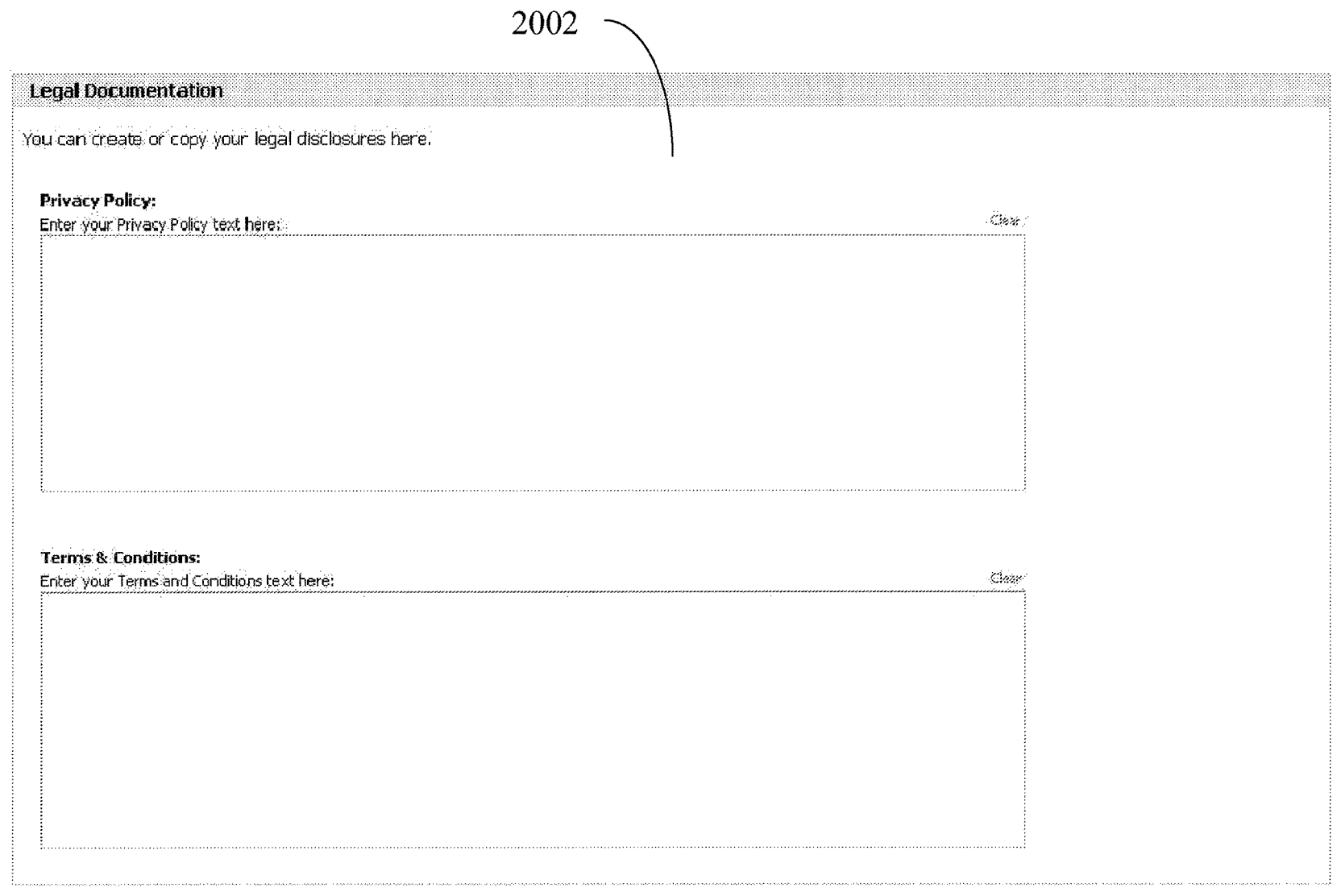

In some embodiments, the template module provides an interface that allows for the specification of a privacy policy and terms and conditions that govern the campaign. Referring to FIG. 20, in some embodiments, the text for the privacy policy and terms and conditions is entered through panel 2002. In some embodiments, the template module provides an interface that allows for the specification of a company address. Referring to FIG. 21, in some embodiments, the company address is entered through panel 2102.

User Flow Module.

User flows have been described above in conjunction with FIG. 2. In some embodiments, a user flow module of the create campaign tool allows a campaign designer to create different user flow versions of the copy and images in the campaign to compare to one another. Each campaign has at least one user flow and there is no limit to the number of flows that can created or associated with a campaign. In some embodiments, each running flow will be randomly assigned to viewers of a campaign advertisement so that the performance of flows can be compared against one another using reporting tools, such as those disclosed in U.S. Pat. No. 8,140,376 which is hereby incorporated by reference herein in its entirety.

In some embodiments, the first step to creating a user flow involves giving it a name. In some embodiments, this name is only used within the campaign tool and the reporting tools and is not shown to participants. An optional reward that is provided to campaign participants who are a part of the user flow is then selected. If the user flow is not to include a reward, then "No Reward" is selected. An optional gift that participants of a campaign user flow are to receive is also associated with the user flow. If the user flow does is not to include a gift, then "No Gift" is selected.

Figure 22:
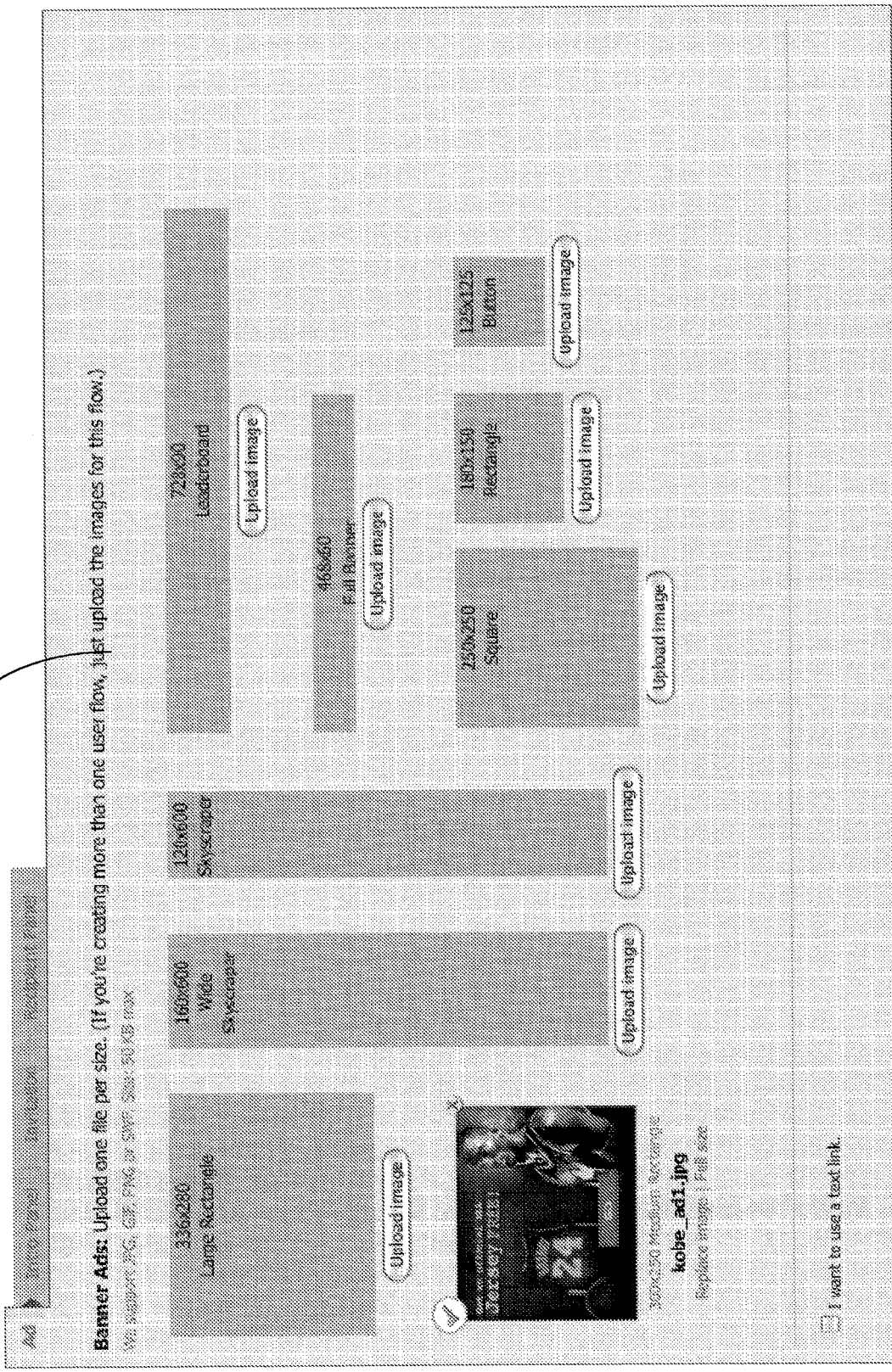
FIG. 22 illustrates a panel 2202 for defining the initial advertisement that will be displayed in a user flow of a campaign.

Referring to FIG. 22, the user flow module provides a panel 2202 for defining the initial advertisement that will be displayed in a user flow of a campaign. Using panel 2202, an image (e.g., jpg, gif, png, swf) is uploaded for all of the ad sizes that are to be used. In some embodiments, all the user flows of a given campaign support the same sizes (e.g. if particular sizes are used for one user flow, those sizes are used in all user flows). In some embodiments, the following standard IAB advertisement sizes are supported by the user flow module: 728×90 (Leaderboard), 300×250 (Medium Rectangle), 160×600 (Wide Skyscraper), 468×60 (Full Banner), 120×600 (Skyscraper), 336×280 (Large Rectangle), 250×250 (Square), 125×125 (Square Button), and 180×150 (Rectangle). In some embodiments, the user flow module also allows for the inclusion of URL links to display advertisements.

Figure 23:
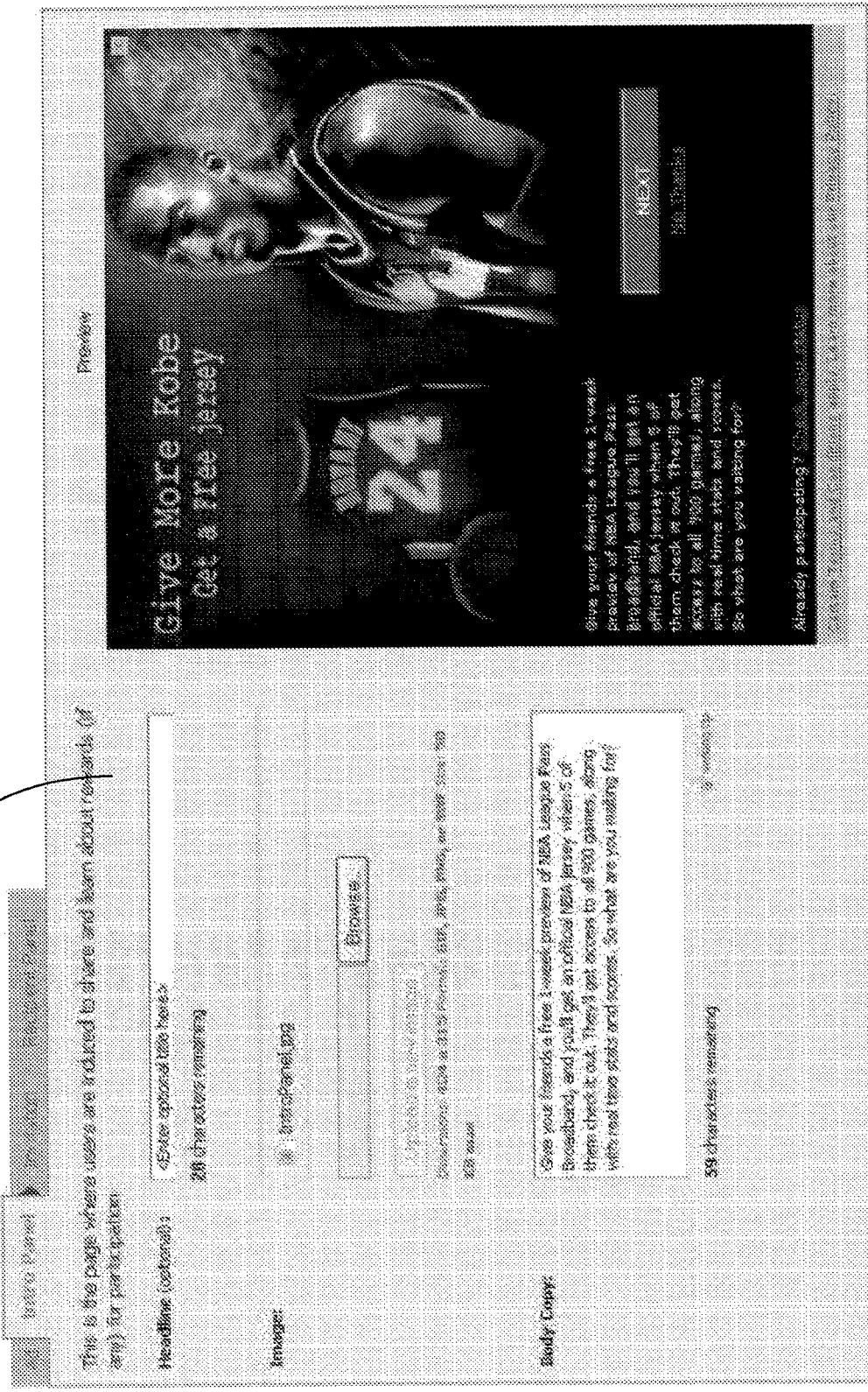
FIG. 23 illustrates a user interface panel that defines the components of an introduction panel of a user flow.

In some embodiments, each user flow provides an introduction panel. In some embodiments, the introduction panel is the light box overlay that comes up when a participant clicks on the advertisement. In some embodiments, the creative on this panel clearly identifies why people should invite their friends to take part in the campaign. In some embodiments this is done by describing the reward that the inviter can receive, the gift that they can provide to their friend, or simply explain why the campaign is compelling. Referring to FIG. 23, in some embodiments the user flow module provides a user interface panel 2302 that defines the components of the introduction panel of the user flow. As each of the components specified in user interface panel 2302 are populated, the preview pane on the right of panel 2302 updates to show what the introduction panel of the user flow will look like.

The optional headline specifies the copy that appears at the top of the introduction panel. This headline is designed to clearly summarize why one would want to share this campaign with their friends. Panel 2302 allows for the uploading of an image (e.g., 400×165 pixels, in for example, jpg, gif, png, or swf) that will display in the middle of the introduction panel. Panel 2302 allows for body copy, which is additional optional explanatory copy that clarifies the details of the campaign. It can explain the logistics of the campaign in concise terms. In some embodiments, legal disclosures can be placed on the terms and conditions page which is accessed by clicking on the terms and conditions link in the footer of the panel. For example, a line such as this can be included in the body copy: "Please make sure to check Terms & Conditions by clicking on the link below."

Figure 24:
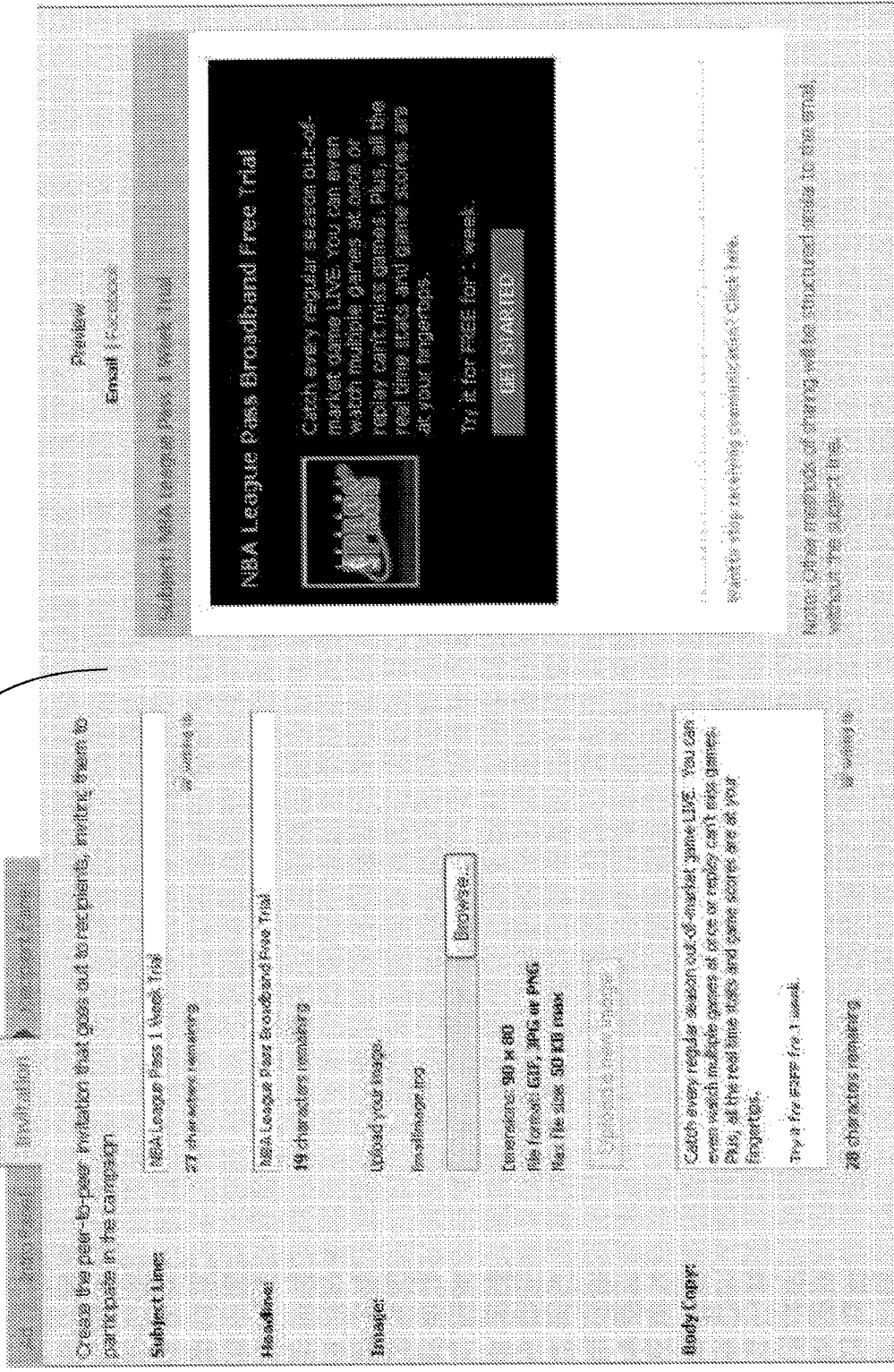
FIG. 24 illustrates a user interface panel that allows for the specification of a creative for an invitation panel of a user flow.

In some embodiments, each user flow provides an invitation panel. In some embodiments, the invitation panel allows participants to invite their friends by sending an email, posting to their social network profile (e.g., FACEBOOK, MYSPACE, etc.) or blog, or by copying embed code and putting it on their own site. Referring to FIG. 24, in some embodiments, the user flow module provides a user interface panel 2402 that allows for the specification of the creative for this invitation. In some embodiments, the invitation comprises a subject line (the default subject line of the invitation emails). In some embodiments, participants can modify this if they choose. In some embodiments, the invitation further comprises a headline, which serves as the headline for the invitation. The headline serves to clearly and concisely summarize the campaign. FACEBOOK posts only include headlines and participant generated comments, so in some embodiment care is taken to make sure that the headline does not require other context to be understood. In some embodiments, the invitation further comprises an image (e.g., 90×80 pixels) that will be used in the invitations. In some embodiments, the invitation includes body copy that provides an explanatory copy for the invitation.

Figure 25:
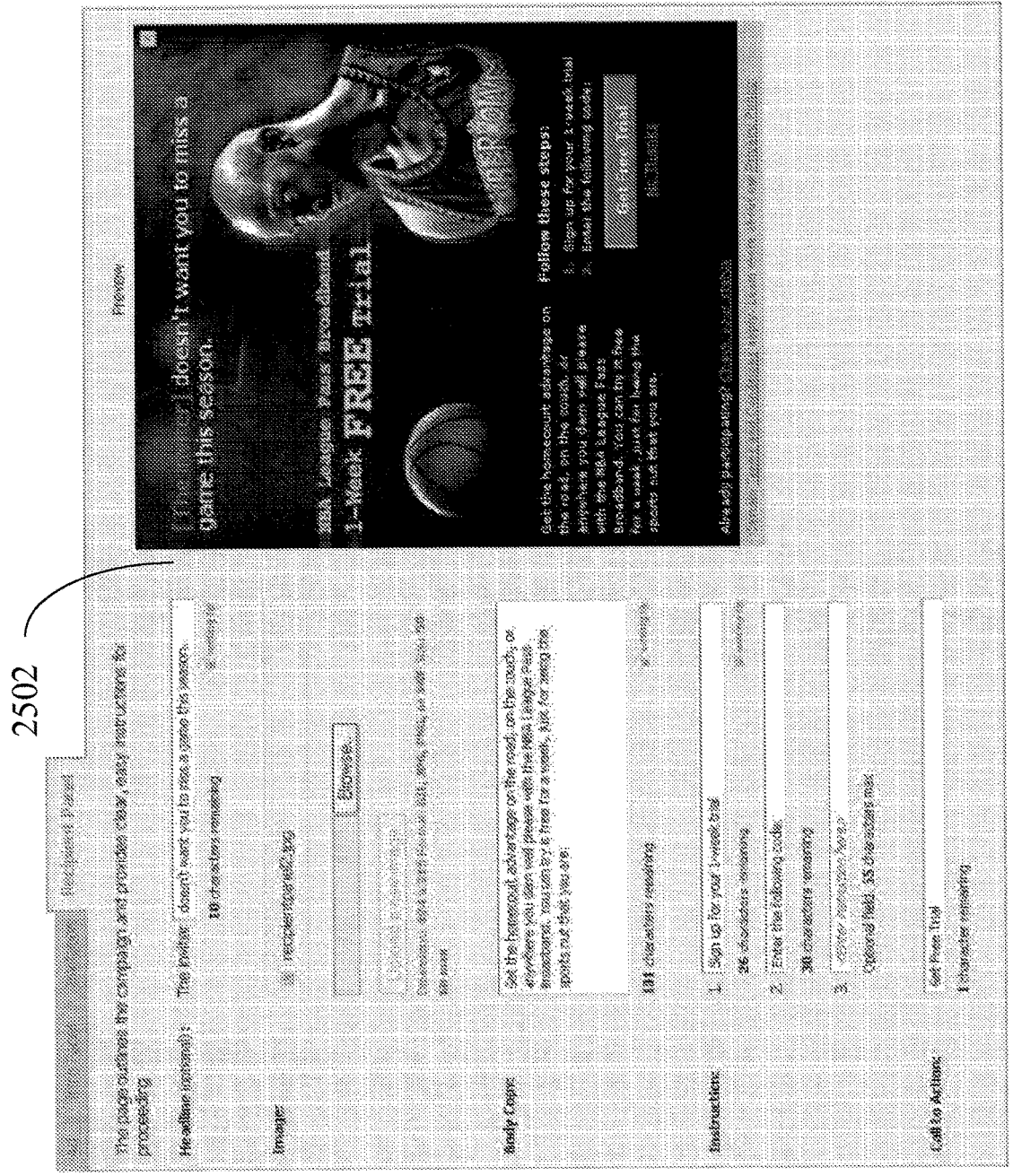
FIG. 25 illustrates a user interface panel that allows for the specification of a recipient panel of a user flow.

In some embodiments, each user flow provides a recipient panel. In some embodiments, the recipient panel is a light box overlay that comes up above the target website of the campaign when a recipient clicks through on an invitation. The creative on the recipient panel is intended to clearly identify why people should complete the campaign action. In some embodiments this is accomplished by describing the gift that they get or simply by explaining why this campaign is compelling. Referring to FIG. 25, in some embodiments, the user flow module provides a user interface panel 2502 that allows for the specification of the creative for this recipient panel. Referring to FIG. 25, in some embodiments the recipient panel provides a headline which is copy that appears at the top of the panel. Preferably, the headline clearly summarizes why one would want to complete the campaign action associated with the user flow. In some embodiments the recipient panel provides an image (e.g., 400×165 pixels in e.g., jpg, gif, png or swf format) that will display in the middle of the panel. In some embodiments, the recipient panel provides body copy which is additional explanatory copy that clarifies the details of the campaign. The body copy can be used explain the logistics of the campaign in concise terms. In some embodiments the recipient panel provides specific steps explaining how the recipient can complete the campaign action. In some exemplary embodiments there are either two or three steps. In some embodiments the recipient panel provides a call to action for the button that recipients will click on if they are interested in participating in the campaign.

Evaluation of User Flows.

One embodiment of a data model may correlate the occurrence of an event with the customer who completed the event, the user flow in which the customer participated and the participant that invited the customer who completed the event. The data model in such cases is represented in Table 3 as follows:

| Data model for the invitation process and manifestations of the invitation process | | | |
|---|---|---|---|
| CustomerID | ParentCustomerID | TrialCode | EventCode |
| cID_1 | pID_1 | Tc_1 | Ec_1 |
| cID_2 | pID_2 | Tc_2 | Ec_2 |
| cID_3 | pID_3 | Tc_3 | Ec_3 |
| ... | ... | ... | ... |

Table three contains a title row divided into columns which contain text identifying the data contained in the columns below. Each row other than the title row contains data relating to a specific user of the viral marketing system. Each CustomerID data, cID_1, cID_2, cID_3, etc. is a unique identifier for any potential user that was sent an invitation. The ParentCustomerID data, pID_1, pID_2, pID_3, etc., is the CustomerID of the inviter of the user and is maintained as data to help establish the parent-child relationships of the users. The TrialCode data, tc_1, tc_2, tc_3, etc. is number identifying a user flow comprised of specific user flow attributes. The EventCode data ec_1, ec_2, ec_3, etc. is a number identifying the last traversal point in the user flow of the customer associated with the CustomerID. The data represented in table 3 is stored in memory 12 and preferably in a relational database 14 of the system.

As explained above, user interaction with user flows produces data such as that shown in table 3. The data is analyzed as "Metrics" and used to determine the appropriate configuration of a user flow definition. "Metrics" are monitored in order to infer the effect of user flow variations, e.g. metrics are used as an indicator of the relative success of the user flows. The fundamental business process for pursuing the critical business objectives is using metrics to choose the correct user flow configuration.

"Metrics" are used to evaluate or monitor the invitation process 210 and the web processes 220, and may be evaluated or monitored in (near) real time. The metrics, and the processes used to compute the metrics, comprise an analytical suite 22. Each metric is designed to monitor characteristics of user flows 201-206 that are an important part of perpetuating the invitation process 210 and motivating user actions. These metrics are intended to, and usually will, have different values for each individual user flow. The metrics allow a user flow's impact to be compared to the impact of other user flows. The user flows that are relatively good performers as determined by analysis of the metrics are used as substitutes for relatively poor performing user flows after enough data has been generated to make a compelling case for such substitutions. Substitutions are made to achieve the business objectives (maximize the number of participants in the invitation process, maximize the number and/or amount desired consumer actions, and minimize the outlay required for both).

A number of metrics may be utilized to monitor important characteristics of the invitation process in (near) real time. The metrics include an invitation metric, an incentive metric, a page views metric, a page conversion rate metric an offspring count metric, and an influencer metric. Definitions, descriptions, comments, and examples of invitation metric, an incentive metric, a page views metric, a page conversion rate metric and offspring count metrics are disclosed in U.S. Pat. No. 8,140,376, which is hereby incorporated by reference in its entirety.

Figure 26:
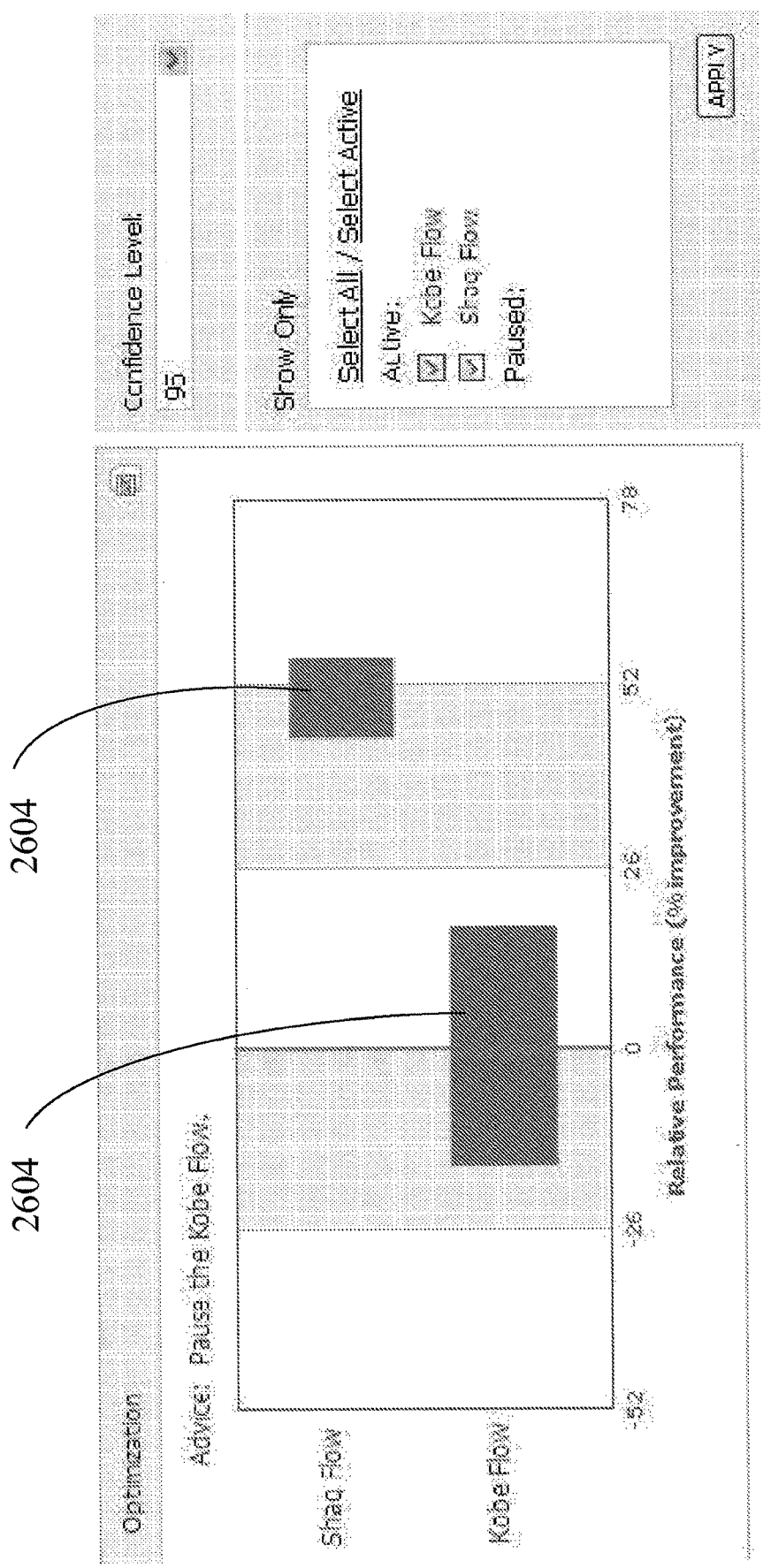
FIG. 26 illustrates an optimization report in accordance with an embodiment of the disclosure.

Some embodiments provide an optimization report such as the optimization report disclosed in FIG. 26. If different versions or user flow are being tested in a campaign, this report assists in the determination of which user flow is the most effective at driving a defined campaign action. The system analyzes participation in the campaign and applies statistical analysis and predictive modeling techniques to identify the best user flow.

Figure 27:
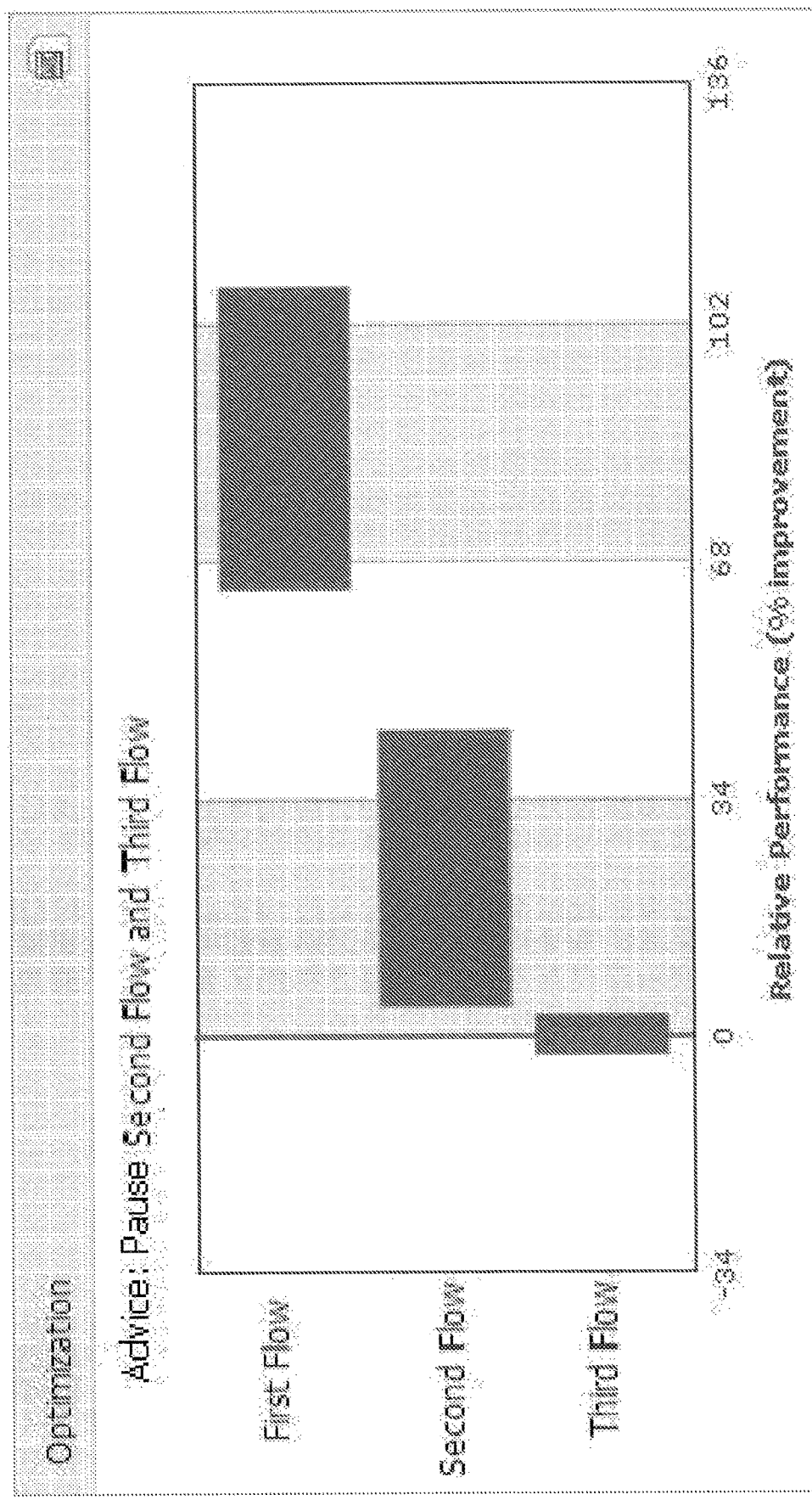
FIG. 27 illustrates a first example of an optimization report at a 95 percent confidence level.
Figure 28:
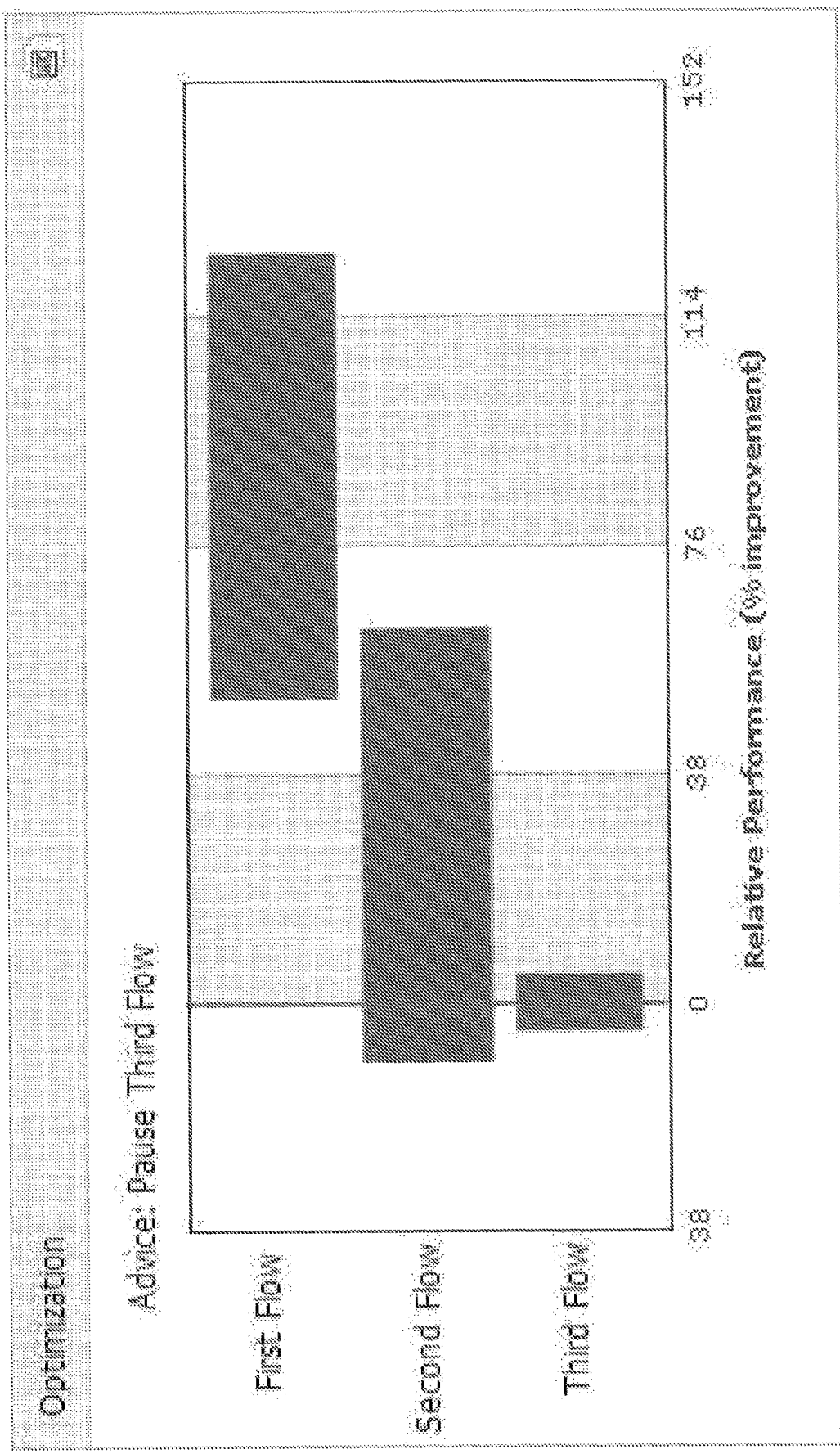
FIG. 28 illustrates a second example of an optimization report at a 99 percent confidence level.

Referring to FIG. 26, relative performance on the x-axis is a relative scale indicating how successful each user flow is at driving the campaign action relative to the lowest performing active user flow. Flow name on the y-axis (e.g., Shaq Flow, Kobe Flow) is the user flow name that was specified when the campaign was created. Analysis of the report depicted in FIG. 26 can be used to determine which user flow(s) to pause, or take offline. When an underperforming user flow is paused, all traffic will be automatically re-routed to the remaining user flows of the campaign. The exemplary report disclosed in FIG. 26 provides advice at the top on which flows the system suggests be paused given the chosen confidence level. The bars 2604 show the best and worst performance that can be expected from each user flow. If the bars do not overlap on the x-axis, the lower-performing user flow(s) can be paused or taken off-line. If the bars do overlap on the x-axis, the system needs more data to determine which user flow will be more successful at that level of confidence. In this instance, a campaign designer can either send more seed traffic, or choose a lower confidence level. FIG. 27 provides a first example. In this first example, there is no overlap on the x-axis between the bar for the first user flow and either of the two other bars, meaning that one can be 95% certain that the first user flow will out-perform the other two user flows. Referring to FIG. 28, at 99% confidence, however, each bar slightly overlaps its neighbor. For instance, referring to FIG. 28, there is overlap on the x-axis between the first and second user flows. This means that it is still possible that the second user flow could perform better than the first user flow. More data is needed before making a decision. There is also overlap between second and third in FIG. 28. It is also possible that the third user flow could perform better than the second user flow. More data is needed before making a decision. However, there is no overlap on the x-axis between first and third user flows. No matter what else happens, one can be 99% certain that the first user flow will outperform the third. So given the exemplary report depicted in FIG. 28, one can safely turn off the third user flow.

Figure 29:
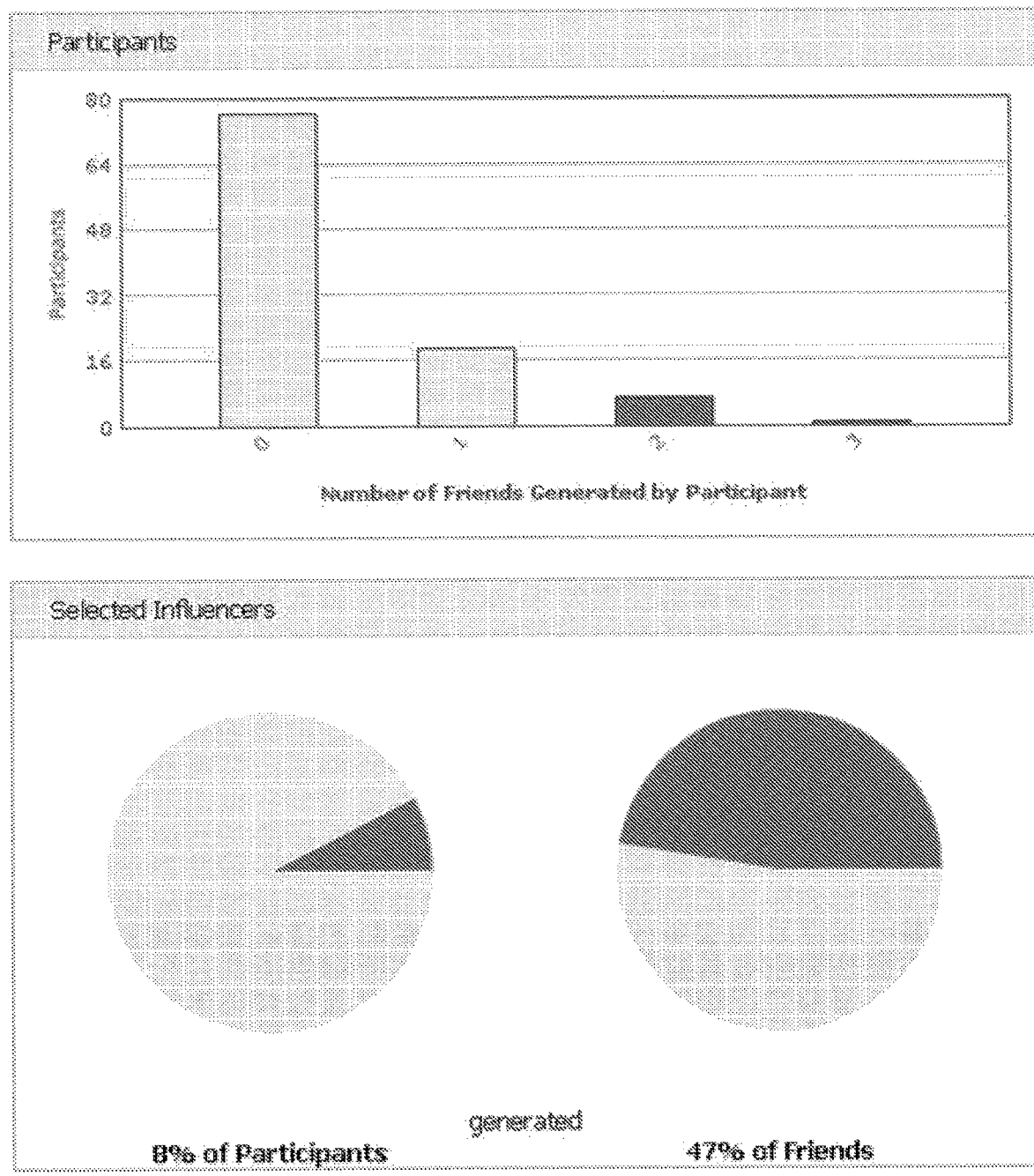
FIG. 29 illustrates two view options for identifying influencers of a campaign.

Referring to FIG. 29, disclosed is an influencer report in accordance with an embodiment of the present disclosure. In social media, influence is the ability to motivate others to take a particular action, such as engaging with a brand, passing along a message, or making a purchase. The influence report depicted in FIG. 29 measures each participant's level of influence, allowing one to segment the audience for effective remarketing initiatives. The influencer function allows for the identification of campaign participants who create brand enthusiasm, the segmentation of consumer lists by influence, the selection of custom influencer criteria (e.g., ability to drive value, actions, or participation). Moreover, influencer lists can be exported for targeted remarketing. In the embodiment illustrated in FIG. 29, there are two view options a pie chart and a data table. The pie chart allows for the determination of the impact that top influencers have on a campaign. The data table enables the determination of contact information and statistics for influencers who meet selected criteria. Examples of influencer criteria include, but are not limited to, the number of friends the influencer has introduced to the campaign, the number of invited peers who participate in the campaign, the number of campaign actions completed by the participant and the people they invited, and the total value generated by the participant and the people they invited. A subset of the campaign audience can be obtained by setting minimum and maximum influence values. To choose only top influencers, a maximum value toggle is set to a highest value (default) and a minimum value toggle is set to a desired threshold. Alternately, the view options to pie chart can be changed and a minimum value can be adjusted until a selection includes the desired percentage of the total audience of a campaign.

Messaging.

Consumer conversations are a rich source of marketing insight. Advantageously, the present invention provides for the analysis of campaign participant dialog. The most frequently used terms used by inviters in invitations is identified in some embodiments of the present disclosure. This language can be used in keyword buys and messaging. Referring to FIG. 30, key terms being used by participants in describing the campaign can be viewed and immediate insight into the perception of the brand associated with the campaign can be determined. This information can be used to improve overall marketing messages.

Referring to FIG. 30, some embodiments provide for the determination of keyword frequency using a semantic cloud that shows the 100 most-used words. Terms are arranged alphabetically. The more frequently a word is used, the larger it appears. Further referring to FIG. 30, some embodiments provide a table that shows key statistics for all of the words used by campaign participants. In some embodiments, clicking on any column header re-orders the list according to that statistic. In the table, "term" is the word used in invitations (common words like "the" are not shown), "% of Messages Using" means, of all messages that were created, the percent that used this term, "Avg. Per Invite" means, of all the messages containing this word, the average number of times this term was used per invitation, and "Total Usage" means the total number of times this word was used in all invitations.

Exemplary Embodiments.

One aspect of the present disclosure provides a method of influencing an Internet-based marketing campaign. The method comprises (A) initiating, using a suitably programmed server computer, the Internet-based marketing campaign. The Internet-based marketing campaign comprises a defined campaign action, an introduction panel, an invitation panel, recipient panel and a target website. The initiating (A) comprises sending the introduction panel to a plurality of remote devices, each remote device in the plurality of remote devices associated with an N generation recipient in a plurality of N generation recipients. An example of an introduction panel is panel 3102 provided in FIG. 31. The introduction panel provides an inducement for the N generation recipient to share the invitation panel with one or more N+1 generation recipients. In the case of panel 3102, the inducement is "Rally 10 fellow cardmembers to do the same, and we'll plant a tree in your honor that will absorb 1 ton of carbon emissions during its lifetime."

Figure 31:
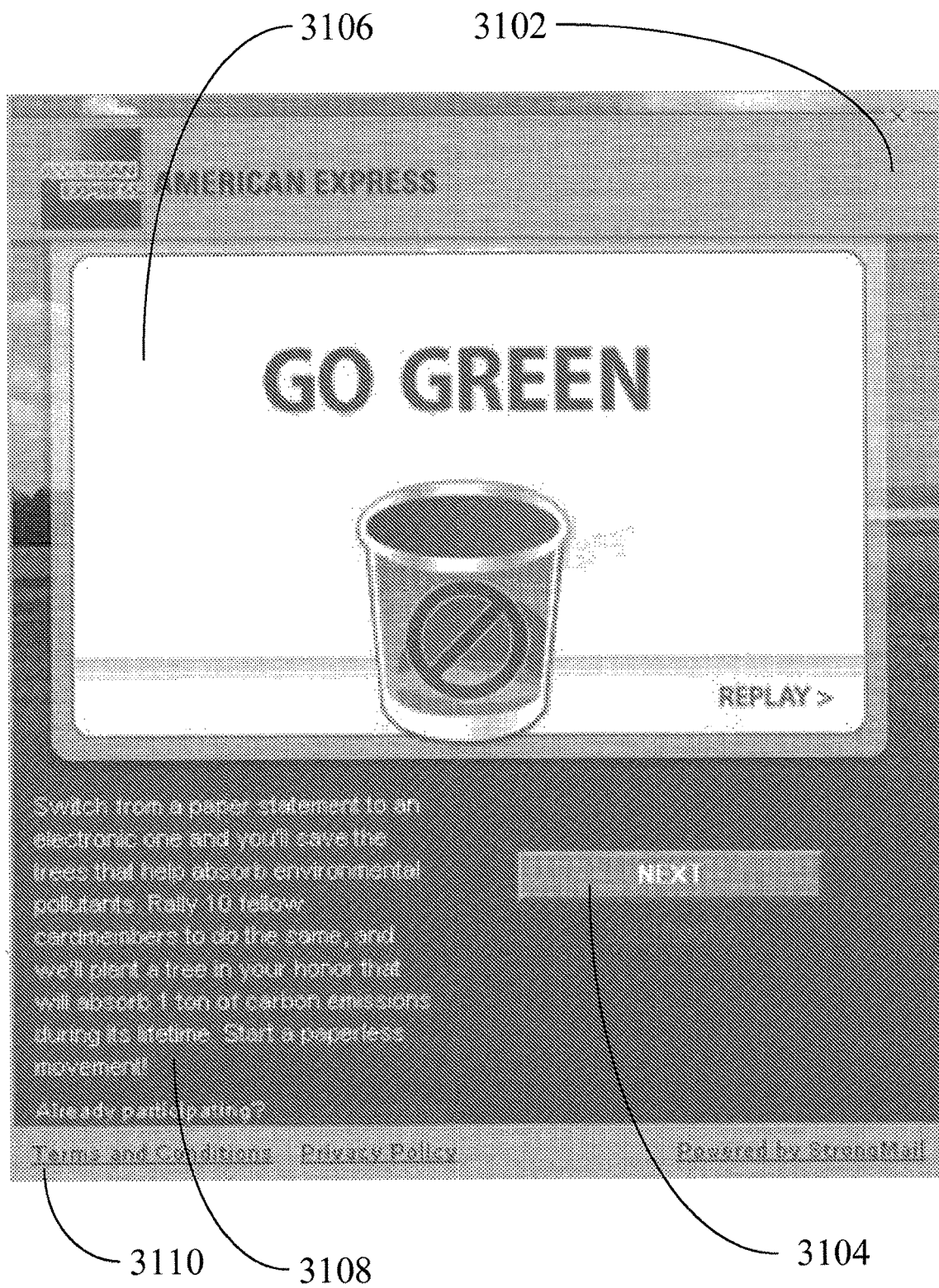
FIG. 31 illustrates an example of an introduction panel.
Figure 32:
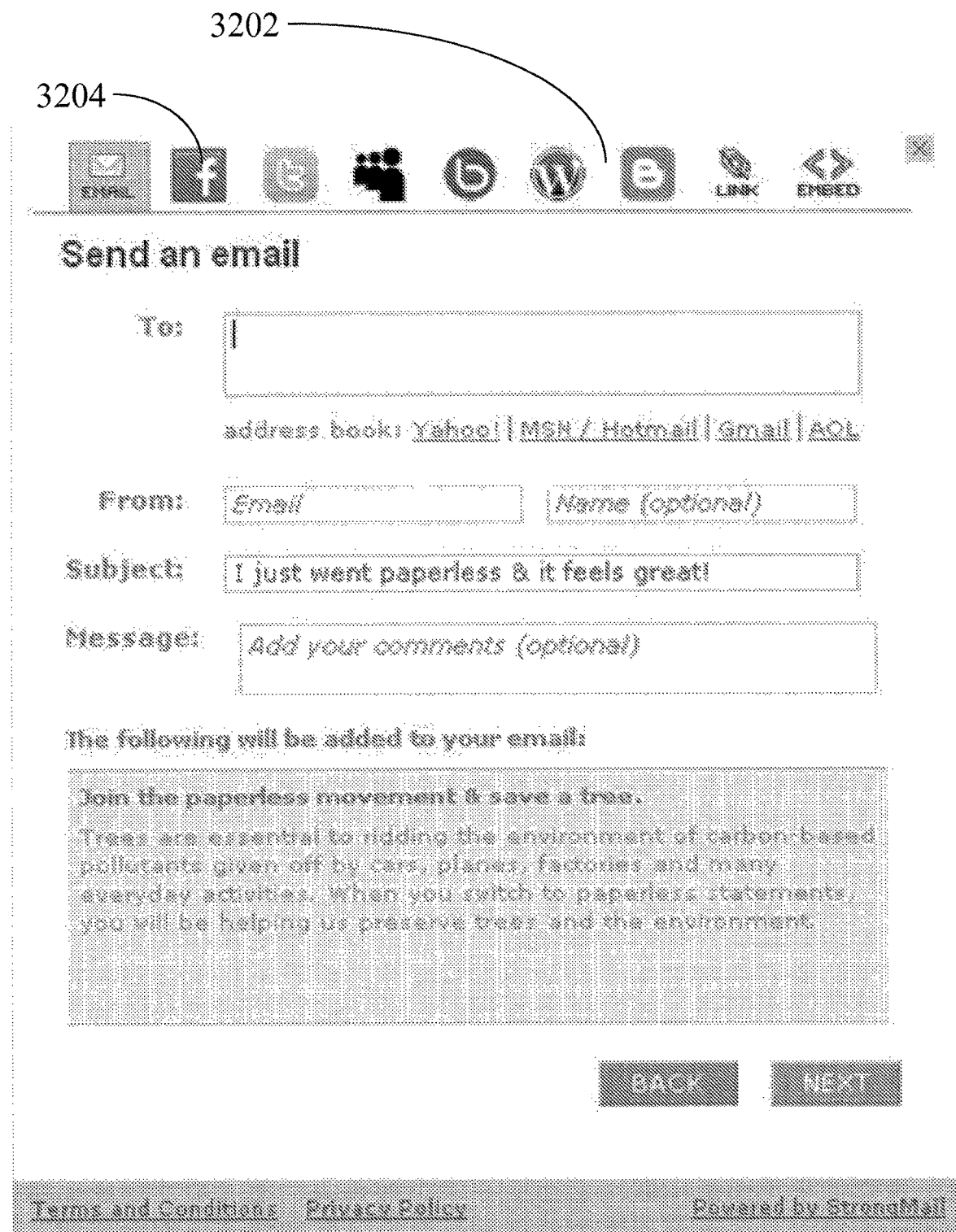
FIG. 32 illustrates a first exemplary panel that can be used by an N generation recipient to invite one or more N+1 generation recipients.
Figure 33:
FIG. 33 illustrates a second exemplary panel that can be used by an N generation recipient to invite one or more N+1 generation recipients.

In the example illustrated in FIG. 31, when the user presses next button 3104, panel 3202, illustrated in FIG. 32, is displayed. Using panel 3202, an N generation recipient can invite one or more N+1 generation recipients. The N generation recipient may either (i) send the invitation in an e-mail or other form of electronic communication to each of the one or more N+1 generation recipients they wish to invite or (ii) post the invitation to a social network profile, a blog, or as embed code in a website associated with the N generation recipient that will be viewed by N+1 generation recipients. For example, in panel 3202, if the user selected icon 3204, panel 3402, illustrated in FIG. 33, is displayed and the N generation recipient can submit the invitation to their FACEBOOK account where each of the N generation recipient's FACEBOOK friends will be deemed N+1 generation recipients.

The method further comprises (B) tracking, using a suitably programmed server computer, each respective N generation recipient that uses the introduction panel (e.g., panel 3102 of FIG. 31) to invite one or more N+1 generation recipients, where, for each respective N generation recipient: the tracking (B) comprises receiving a first electronic notification over the Internet when the respective N generation recipient uses the introduction panel to invite one or more N+1 generation recipients, and the first electronic notification comprises one or more electronic identifications. For instance, when the N generation recipient populates panel 3202 of FIG. 32, a first electronic notification that includes the information in the populated panel 3202 (e.g., E-mail address, messages, etc.) is sent to a suitably programmed server computer over the Internet.

Figure 34:
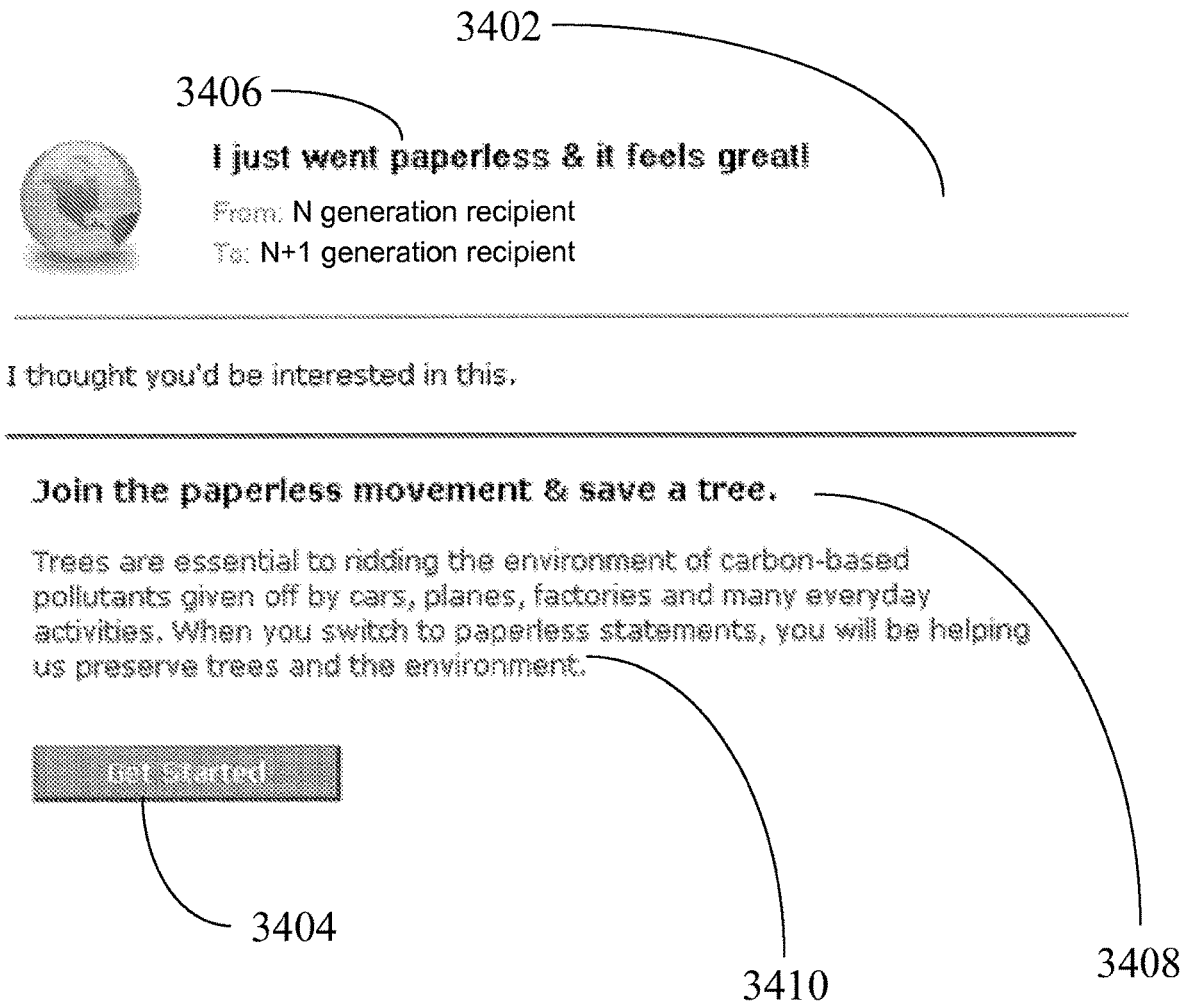
FIG. 34 illustrates a first exemplary invitation panel.
Figure 35:
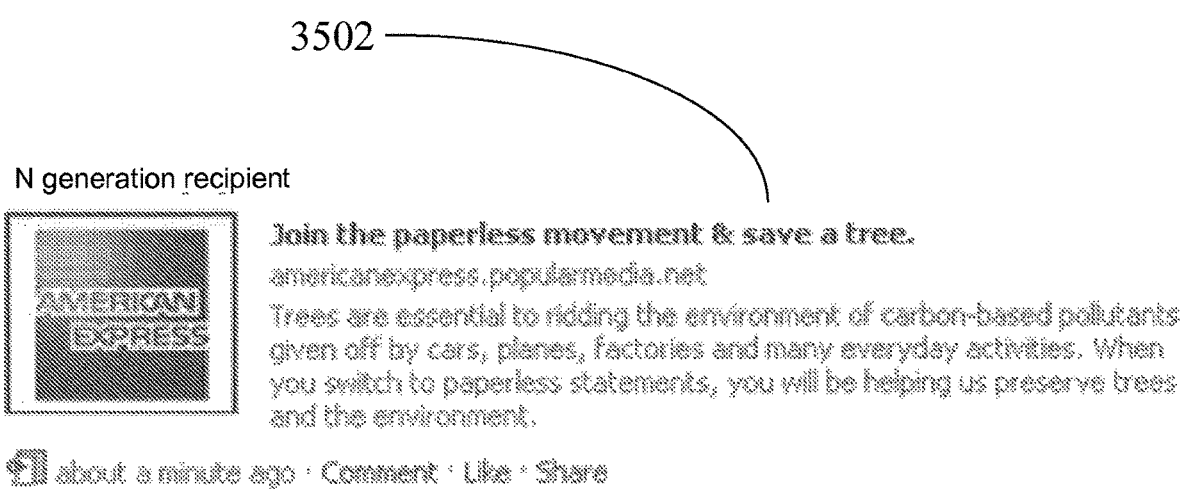
FIG. 35 illustrates a second exemplary invitation panel.

Responsive to the tracking (B), the method further comprises (C) sending an invitation panel, over the Internet, using a suitably programmed server computer, to the one or more electronic identifications identified by each of the first electronic notifications obtained by the tracking (B). FIG. 34 illustrates an exemplary invitation panel 3402 that is received by N+1 generation recipients. In the embodiment illustrated in FIG. 34, the invitation panel 3402 is received in the form of an E-mail. The N+1 generation recipient is not asked to respond directly to this E-mail, but rather is asked to go to a predetermined web site where they will be asked to complete a campaign action. FIG. 35 illustrates an exemplary invitation panel 3502 that is received by N+1 generation recipients. In the embodiment illustrated in FIG. 35, the invitation panel 3502 is received in the form of a posting on the FACEBOOK home page of each FACEBOOK friend of the N generation recipient.

Figure 36:
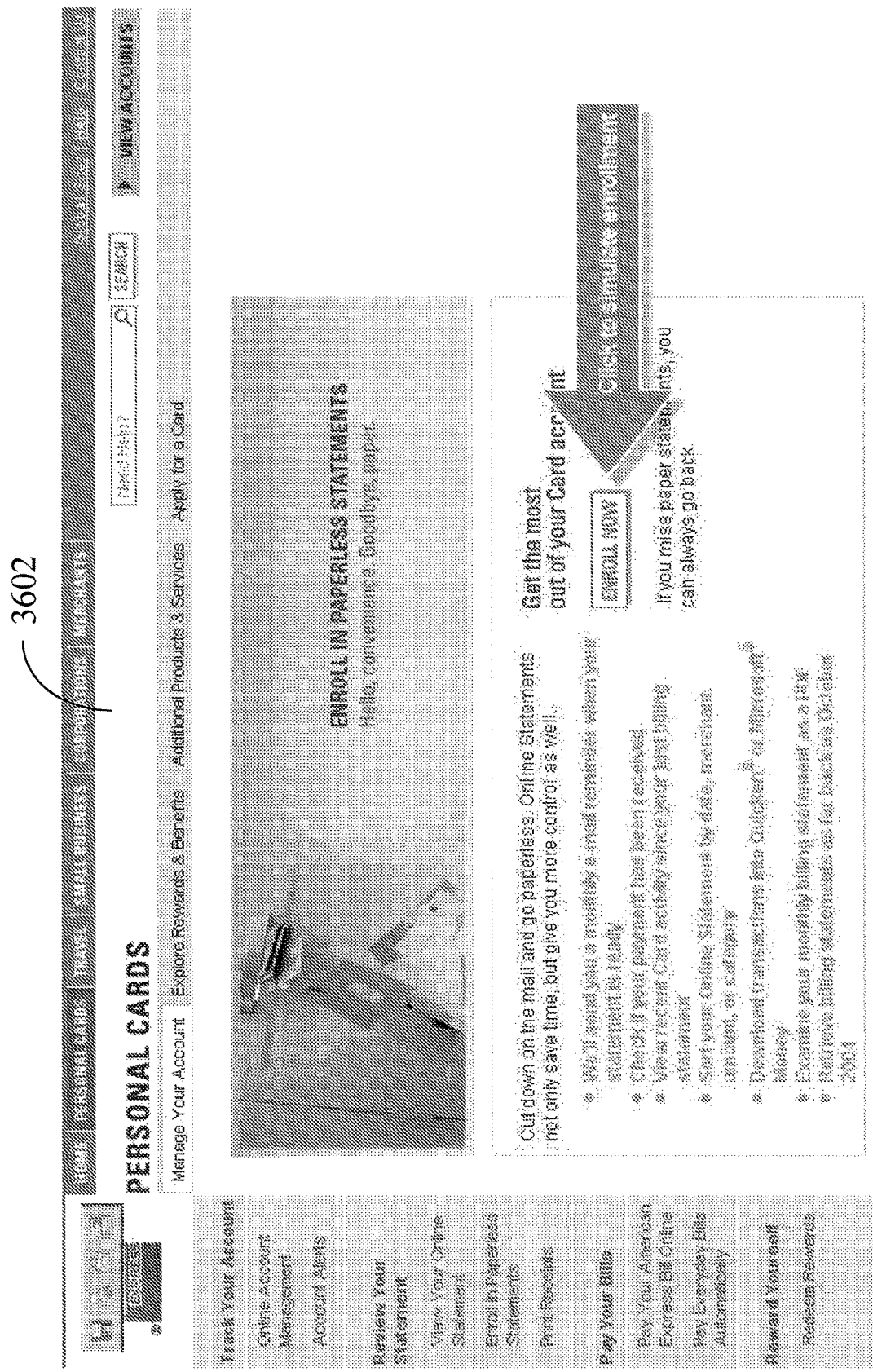
FIG. 36 illustrates a website where recipients can perform a defined campaign action.

The method further comprises (D) tracking, using a suitably programmed server computer, which respective N+1 generation recipients uses the invitation panel to perform the defined campaign action at a target website. This tracking (D) comprises receiving a respective second electronic notification at a suitably programmed server computer over the Internet when a respective N+1 generation recipient performs the defined campaign action. For instance, when an N+1 generation recipient selects button 3404 of panel 3402 (FIG. 34), they are directed to website 3602 (FIG. 36) where the recipient will see a recipient panel overlayed on the website first. The recipient panel encourages the recipient they can then perform the defined campaign action at the website. In the example illustrated in FIG. 34, the defined campaign action is enrolling for paperless AMERICAN EXPRESS statements.

The method further comprises (E) crediting, using a suitably programmed server computer, each respective N generation recipient with each N+1 generation recipient that (i) was invited to the campaign by the respective N generation recipient and (ii) performs the defined campaign action at the target website. For instance, if an N generation recipient invites five N+1 generation recipients and three of them perform the defined campaign action, the N generation is credited for having three N+1 generation recipients perform the defined campaign action.

The method further comprises repeating the tracking (B), sending (C), tracking (D) and crediting (E) one or more times. One of skill in the art will appreciate that, as more generations are added, there may be multiple instances of the tracking (B), sending (C), tracking (D) and crediting (E) occurring at any given time because N+1 generation recipients do not all respond to the invitation panel at the same time. Each time the tracking (B), sending (C), tracking (D) and crediting (E) is repeated, N is advanced by a generation, thereby forming M generations of recipients. For example, if the sending (C) is repeated once, then invitations are sent to an N+2 generation of recipients, if the sending (C) is repeated twice, then invitations are sent to an N+3 generation of recipients and so forth, thereby forming M generations of recipients, where M is the highest number N achieved by the repeating. The process terminates when the existing recipients do not invite any more recipients or the campaign is closed. For the example, the campaign may be closed because an event associated with the defined campaign action (e.g., a movie, a sale) is no longer offered.

Advantageously, each time the tracking (B), sending (C), tracking (D) and crediting (E) is repeated, for each respective N generation recipient credited in the crediting (E), the method further comprises crediting each ancestor recipient that invited (i) the respective N generation recipient or (ii) another ancestor of the respective N generation recipient to the campaign. For example, consider the above example where an N generation recipient invites five N+1 generation recipients, three of which perform the defined campaign action. As stated earlier, the N generation recipient is credited with the performance of three defined campaign actions. Further consider the case in which four of the invited N+1 generation recipients invite a total of 12 N+2 generation recipients, eight of which perform the defined campaign action. In this case, the original N generation recipient would also be credited with the eight campaign actions. In this way, campaign influencers can be identified.

In some embodiments, the suitably programmed server computer of the initiating (A), the tracking (B), the sending (C), the tracking (D), the crediting (E), and the repeating (F) is the same suitably programmed server computer. In some embodiments, the suitably programmed server computer of at least one of the initiating (A), the tracking (B), the sending (C), the tracking (D), the crediting (E), and the repeating (F) is different. For example, in some embodiments, one suitably programmed server computer is used to perform a first subset of the initiating (A), the tracking (B), the sending (C), the tracking (D), the crediting (E), and the repeating (F) steps and another suitably programmed server computer is used to perform a second subset of the initiating (A), the tracking (B), the sending (C), the tracking (D), the crediting (E), and the repeating (F) steps In some embodiments, the defined campaign action is making a purchase, making a lease, watching a video, listening to a song, or obtaining a subscription to media. In some embodiments, referring to FIG. 31, the introduction panel 3102 further comprises an optional header that specifies the copy that appears at the top of the introduction panel, an image 3106 that displays in the middle of the introduction panel, body copy 3108 that clarifies the details of the campaign, where the body copy 3108 includes the inducement and, an optional link 3110 to a legal disclosures panel.

Referring to FIG. 34, in some embodiments, the invitation panel comprises an optional subject line 3406, a headline 3408 that summarizes the campaign, an optional image and body copy 3410 that provides details of an invitation to the campaign.

In some embodiments, an electronic identification in the one or more electronic identifications in the first electronic notification is an e-mail address of an N+1 generation recipient and the sending (C) comprises sending the invitation panel by email to the N+1 generation recipient.

In some embodiments, an electronic identification in the one or more electronic identifications in the first electronic notification is a social network profile of the N generation recipient and the sending (C) comprises sending the invitation panel to the social network profile of the N generation recipient. In such embodiments, the friends of the N generation recipient in the social network profile are deemed to be the N+1 generation recipients.

In some embodiments, an electronic identification in the one or more electronic identifications in the first electronic notification is a blog of the N generation recipient and the sending (C) comprises sending the invitation panel to the blog of the N generation recipient, wherein viewers of the blog of the N generation recipient are deemed to be the N+1 generation recipients.

In some embodiments, an electronic identification in the one or more electronic identifications in the first electronic notification is embed code for a website associated with the N generation recipient and the sending (C) comprises embedding the invitation in the website associated with the N generation recipient, wherein viewers of the website associated with the N generation recipient are deemed to be the N+1 generation recipients.

In some embodiments, the inducement comprises a gift card, a sweepstakes entry, a screen saver, an extended preview, a film clip, a video clip, software, a coupon, a discount, or entry into a lottery.

In some embodiments, method further comprises ranking each respective recipient in the M generations of recipients based on total credit received during instances of the crediting (E); and displaying or outputting to tangible computer readable media an identification of top ranked recipients in the M generation of recipients. In some embodiments, a recipient in the M generations of recipients is deemed to be top ranked when the recipient is in a top threshold percentile relative to all other recipients in the M generations of recipients based on total credit received during instances of the crediting (E).

In some embodiments, the method further comprises (i) pooling the M generations of recipients into a population of recipients, (ii) segmenting the population of recipients based on total credit received by each recipient during instances of the crediting (E), thereby forming a segmented population, and (iii) displaying or outputting to tangible computer readable media an identification of recipients in the one or more segments of the segmented population.

Utilizing the disclosed systems and methods, users may create a sustainable flow of high-quality leads and customers, establish a productive and measurable campaign, evaluate and optimize campaign performance with data, leverage the marketing power and influence of consumer social networks, establish a private-label, online social environment for effective brand-building and use existing assets to create new customers, leads, and brand influencers. The utilization of campaign analytics facilitates the creation, performance monitoring, and optimization of campaigns that offer predictable results, sustainable virality, and the ability to leverage campaign results to drive business goals. Utilizing the disclosed systems and methods, marketers can build, deploy, and scale integrated private-label campaigns, perform sophisticated multivariate analysis of creative content and persuasive elements, automate targeted e-mail marketing initiatives, and more. Among the features which may be utilized alone or in combination in embodiments of the disclosed systems and methods are publishing tools, content testing and optimization, e-mail management, reporting and a social network tool set.

Embodiments of the disclosed systems and methods may include a hosted, web-based technology platform that enables users to quickly create, optimize, and scale campaigns. Users may use the technology platform to present branded, socially engaging online experiences optimized to drive specific marketing objectives. Embodiments of the disclosed systems and methods may generate new, highly targeted leads, grow sales, improve brand awareness, build marketing databases, spread marketing messages, increase online and offline traffic and/or drive consumers to ecommerce, downloads, and other calls-to-action. The hosted, web-accessible platform enables marketers to create sustainable, profitable, private-label campaigns using analytics and testing methodologies.

The technology platform may include features designed for easing the use of the disclosed systems and methods. The technology platform may include configurable flexible templates and modules with customer specific brand, messaging, experience, and/or content. The technology platform may also include automated optimization of the campaign.

As will be recognized by those of ordinary skill in the art of on-line marketing, effective seeding and high seeding volume leads to faster program optimization and realization of business results, whereas ineffective or low-volume seeding prevents the program from realizing its potential. Campaigns benefit from a steady source of seed traffic. The disclosed systems and methods may indicate the best sources and right volume for a viral marketing program. The disclosed systems and methods envision that campaigns can be seeded in many different ways—including post-purchase links, newsletter links, e-mail announcements, external media buys, and other seed sources.

References Cited and Alternative Embodiments

All references cited herein are incorporated herein by reference in their entirety and for all purposes to the same extent as if each individual publication or patent or patent application was specifically and individually indicated to be incorporated by reference in its entirety for all purposes.

The present invention can be implemented as a computer program product that comprises a computer program mechanism embedded in a computer readable storage medium. For instance, the computer program product could contain any combination of the program modules disclosed herein. These program modules can be stored on a CD-ROM, DVD, magnetic disk storage product, or any other tangible computer readable data or program storage product.

Many modifications and variations of this invention can be made without departing from its spirit and scope, as will be apparent to those skilled in the art. The specific embodiments described herein are offered by way of example only. The embodiments were chosen and described in order to best explain the principles of the invention and its practical applications, to thereby enable others skilled in the art to best utilize the invention and various embodiments with various modifications as are suited to the particular use contemplated. The invention is to be limited only by the terms of the appended claims, along with the full scope of equivalents to which such claims are entitled.

What is claimed:

1. A method of optimizing an Internet-based marketing campaign, the method, using a suitably programmed computer, and comprising:
    (A) defining, via a user using at least one user interface, a first user flow and a second user flow, wherein defining the first user flow and the second user flow includes defining an introduction panel and an invitation panel that is separate and distinct from the introduction panel for the Internet-based marketing campaign, wherein defining the introduction panel and the invitation panel includes specifying components thereof, and wherein the invitation panel is subsequently modifiable by N generation recipients with respect to one or more components such that an invitation panel from the first user flow is different than the invitation panel from the second user flow;
    (B) initiating the Internet-based marketing campaign by sending the introduction panel, without sending the invitation panel, to a first remote device associated with a first N generation recipient and a second remote device associated with a second N generation recipient, thereby beginning the first user flow and the second user flow, respectively, wherein:
        the Internet-based marketing campaign comprises a defined campaign action, the introduction panel, the invitation panel, and a target website, and
        the introduction panel provides an inducement for the first and second N generation recipients to share the invitation panel with one or more N+1 generation recipients;
    (C) tracking the first N generation recipient using the introduction panel to invite a first set of N+1 generation recipient and the second N generation recipient using the introduction panel to invite a second set of N+1 generation recipients, wherein:
        the tracking comprises receiving, as part of the first user flow, one or more first electronic notifications over the Internet when the first N generation recipient uses the introduction panel to invite the first set of N+1 generation recipients, wherein the invitation of the first N generation recipient makes use of the invitation panel customized by the first N generation recipient to include a first set of words that describe the Internet-based marketing campaign,
        the tracking further comprises receiving, as part of the second user flow, one or more second electronic notifications over the Internet when the second N generation recipient uses the introduction panel to invite the second set of N+1 generation recipients, wherein the invitation of the second N generation recipient makes use of the invitation panel customized by the second N generation recipient to include a second set of words that describe the Internet-based marketing campaign,
        the one or more first electronic notifications collectively comprise an electronic identification of the first set of N+1 generation recipients,
        the one or more second electronic notifications collectively comprise an electronic identification of the second set of N+1 generation recipients,
        the one or more first electronic notifications comprise the first set of words, and
        the one or more second electronic notifications comprise the second set of words;
    (D) sending the invitation panel, as customized by the first N generation recipient, without sending the introduction panel, over the Internet, using the electronic identification of the first set of N+1 generation recipients identified in the one or more first electronic notifications to each recipient in the first set of N+1 generation recipients, and sending the invitation panel, as customized by the second N generation recipient, without sending the introduction panel, over the Internet, using the electronic identification of the second set of N+1 generation recipients identified in the one or more second electronic notifications to each of the recipients in the second set of N+1 generation recipients;
    (E) tracking which respective N+1 generation recipients uses the invitation panel to perform the defined campaign action at the target website, wherein the tracking (E) comprises receiving a respective feedback electronic notification over the Internet when a respective N+1 generation recipient in the first set of N+1 recipients or the second set of N+1 recipients performs the campaign action;
    (F) repeating, using a suitably programmed computer, the tracking (C), sending (D), and tracking (E) one or more times, wherein, each time the tracking (C), sending (D), and tracking (E) is repeated, N is advanced by a generation, thereby forming M generations of recipients; and
    (G) determining, from the feedback electronic notifications whether the first user flow or the second user flow is more effective in advancing the Internet-based marketing campaign; and
    (H) using the words used by the N generation recipient in the invitation panel associated with the more effective user flow to electronically introduce the Internet-based marketing campaign to an additional set of recipients.

2. The method of claim 1, wherein the defined campaign action is making a purchase, making a lease, watching a video, listening to a song, or obtaining a subscription to media.

3. The method of claim 1, wherein the introduction panel comprises at least the following components:
    an optional header that specifies the copy that appears at the top of the introduction panel;
    an image that displays in the middle of the introduction panel;
    body copy that clarifies the details of the campaign, wherein the body copy includes the inducement; and
    an optional link to a legal disclosures panel.

4. The method of claim 1, wherein the invitation panel comprises at least the following components:
    an optional subject line;
    a headline that summarizes the campaign;
    an optional image; and
    body copy that provides details of an invitation to the campaign.

5. The method of claim 1, wherein an electronic identification of the first set of N+1 generation recipients includes an e-mail address of an N+1 generation recipient and the sending (D) comprises sending the invitation panel by email to the N+1 generation recipient.

6. The method of claim 1, wherein an electronic identification of the first set of N+1 generation recipients is a social network profile of the N generation recipient and the sending (D) comprises sending the invitation panel to the social network profile of the N generation recipient, and wherein the friends of the N generation recipient in the social network profile are deemed to be the N+1 generation recipients.

7. The method of claim 1, wherein an electronic identification in the one or more electronic identifications in the first electronic notification is a blog of the N generation recipient and the sending (D) comprises sending the invitation panel to the blog of the N generation recipient, wherein viewers of the blog of the N generation recipient are deemed to be the N+1 generation recipients.

8. The method of claim 1, wherein an electronic identification in the one or more electronic identifications in the first electronic notification is embed code for a website associated with the N generation recipient and the sending (D) comprises embedding the invitation in the website associated with the N generation recipient, wherein viewers of the website associated with the N generation recipient are deemed to be the N+1 generation recipients.

9. The method of claim 1, wherein the inducement comprises a gift card, a sweepstakes entry, a screen saver, an extended preview, a film clip, a video clip, software, a coupon, a discount, or entry into a lottery.

* * * * *